(12) United States Patent
Kishigami

(10) Patent No.: US 8,139,456 B2
(45) Date of Patent: Mar. 20, 2012

(54) OPTICAL RECORDING METHOD AND OPTICAL RECORDING DEVICE

(75) Inventor: Tomo Kishigami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/744,085

(22) PCT Filed: Oct. 22, 2008

(86) PCT No.: PCT/JP2008/069120
§ 371 (c)(1),
(2), (4) Date: May 21, 2010

(87) PCT Pub. No.: WO2009/069408
PCT Pub. Date: Jun. 4, 2009

(65) Prior Publication Data
US 2010/0315921 A1    Dec. 16, 2010

(30) Foreign Application Priority Data

Nov. 26, 2007  (JP) ................................. 2007-303930
Apr. 14, 2008  (JP) ................................. 2008-104725

(51) Int. Cl.
*G11B 7/00* (2006.01)
(52) U.S. Cl. .................................................. 369/47.53
(58) Field of Classification Search ............... 369/47.53
See application file for complete search history.

(56) References Cited

U.S. PATENT DOCUMENTS

| | | | |
|---|---|---|---|
| 6,404,713 B1 * | 6/2002 | Ueki | 369/47.53 |
| 6,775,214 B2 * | 8/2004 | Suzuki | 369/47.51 |
| 6,967,914 B2 * | 11/2005 | Udagawa et al. | 369/47.51 |
| 2002/0136121 A1 * | 9/2002 | Salmonsen et al. | 369/47.53 |
| 2003/0021199 A1 | 1/2003 | Suzuki | |
| 2005/0213452 A1 | 9/2005 | Hirose et al. | |
| 2006/0140097 A1 * | 6/2006 | Tasaka et al. | 369/59.11 |
| 2006/0203694 A1 | 9/2006 | Ohhashi | |
| 2007/0081435 A1 * | 4/2007 | Ishitobi | 369/47.52 |
| 2007/0171787 A1 | 7/2007 | Higashino | |
| 2007/0183285 A1 | 8/2007 | Nishimura et al. | |
| 2007/0211593 A1 | 9/2007 | Ueno | |
| 2007/0217306 A1 | 9/2007 | Suzuki et al. | |
| 2008/0298195 A1 | 12/2008 | Kanatake et al. | |

FOREIGN PATENT DOCUMENTS

| | | |
|---|---|---|
| CN | 101315779 A | 12/2008 |
| EP | 1102247 A2 | 5/2001 |
| EP | 1246181 A2 | 10/2002 |
| JP | 2001-297439 A | 10/2001 |
| JP | 2005-310351 A | 11/2005 |
| JP | 3784610 B2 | 6/2006 |
| JP | 2006-252676 A | 9/2006 |

(Continued)

*Primary Examiner* — Aristotelis Psitos
(74) *Attorney, Agent, or Firm* — Birch, Stewart, Kolasch & Birch, LLP

(57) ABSTRACT

In a recording method for recording information on an optical recording medium (500) according to the parameters of a write strategy by repeatedly recording (S23) a certain amount of information onto the optical disc (500) and entering a standby state (S22) in which recording is suspended and data are stored in a buffer memory (190), during an interval while recording is suspended, the information recorded just before is reproduced, the quality of the reproduced signal is measured (S25A), and the write strategy is altered as necessary (S25C) to obtain consistent recording quality. Only one correction is made per suspension period. Consistent recording quality is thus obtained despite changes in the recording position on the optical disc or changes in recording conditions.

20 Claims, 18 Drawing Sheets

FOREIGN PATENT DOCUMENTS

| | | |
|---|---|---|
| JP | 2006-302332 | 11/2006 |
| JP | 2006-302332 A | 11/2006 |
| JP | 2007-200389 A | 8/2007 |
| JP | 2007-200435 A | 8/2007 |
| JP | 2007-213674 A | 8/2007 |
| JP | 2007-234188 | 9/2007 |
| JP | 2007-234188 A | 9/2007 |
| JP | 2007-242139 A | 9/2007 |
| JP | 2007-273021 A | 10/2007 |
| JP | 2007-273031 | 10/2007 |

* cited by examiner

FIG.2(a)    FIG.2(b)    FIG.2(c)
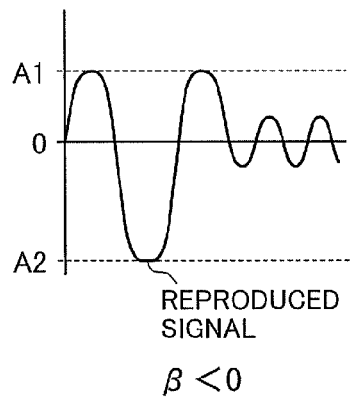
REPRODUCED SIGNAL
$\beta < 0$
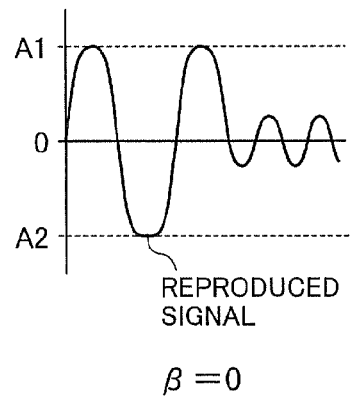
REPRODUCED SIGNAL
$\beta = 0$
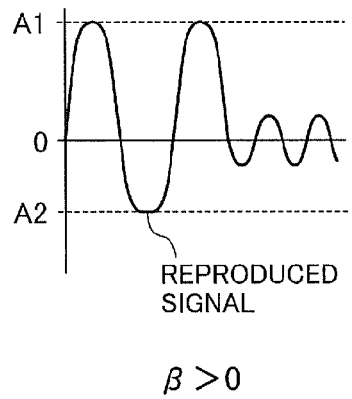
REPRODUCED SIGNAL
$\beta > 0$
FIG.3
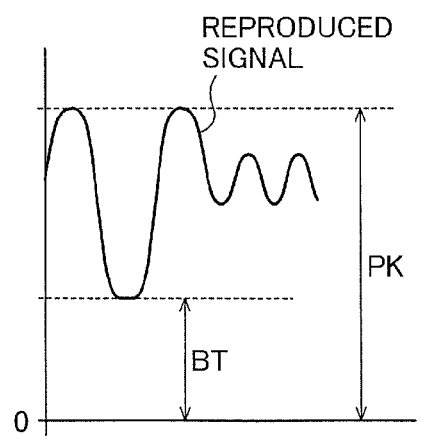

| ID | WRITE STRATEGY PARAMETERS | | | | |
|---|---|---|---|---|---|
| | WS1 | WS2 | WS3 | ... | WSn |
| Maker 1 | WRITE STRATEGY VALUES FOR ID=Maker 1 | | | | |
| Maker 2 | WRITE STRATEGY VALUES FOR ID=Maker 2 | | | | |
| ⋮ | ⋮ | | | | |
| Maker N | WRITE STRATEGY VALUES FOR ID=Maker N | | | | |

OPTICAL RECORDING METHOD AND OPTICAL RECORDING DEVICE

FIELD OF THE INVENTION

The present invention relates to an optical recording method and an optical recording device for recording data on an optical disc, more particularly to a method of adjusting a write strategy used in recording.

BACKGROUND ART

In order to record information on optical discs, the write strategies used in recording must be optimally adjusted to the characteristics of the optical discs; an optical recording device generally holds an optimal write strategy for each optical disc ID (identification information) and uses the optimal write strategy in recording.

When the optimal write strategy specific to an optical disc is used in this way, however, recording cannot always be performed with good recording quality, because of the individual variability of the optical disc or the optical recording device. Another problem has been that recording quality may be lowered due to large optical disc warpage, non-uniform recording characteristics, or temperature changes during recording.

One countermeasure is to temporarily suspend recording and adjust or optimize the write strategy when the temperature changes or the recording speed changes, or at prescribed intervals (see Patent Documents 1 to 4, for example). In another known method, every time a prescribed amount of information is written on an optical disc, a first recording pulse pattern corresponding to the ambient temperature and a second recording pulse pattern corresponding to an altered temperature in the vicinity of the ambient temperature are read, information is written on the optical disc with both recording pulse patterns, and then whichever one of the first and second recording pulse patterns produces information having the lower error rate is selected as the recording pulse pattern for further writing (Patent Document 5). Another method is also known in which a plurality of adjustment amounts are prestored for each temperature parameter, and an adjustment amount corresponding to the temperature near the optical head is selected.

Patent Document 1: Japanese Patent Application Publication No. 2006-302332 (pp. 1-18, FIGS. 1-16)
Patent Document 2: Japanese Patent Application Publication No. 2007-200389 (pp. 1-20, FIGS. 1-16)
Patent Document 3: Japanese Patent Application Publication No. 2007-200435 (pp. 1-9, FIGS. 1-9)
Patent Document 4: Japanese Patent Application Publication No. 2007-213674 (pp. 1-9, FIGS. 1-5)
Patent Document 5: Japanese Patent Application Publication No. 2007-234188 (pp. 1-13, FIGS. 1-7)
Patent Document 6: Japanese Patent Application Publication No. 2007-273021 (pp. 1-11, FIGS. 1-13)

DISCLOSURE OF THE INVENTION

Problems to be Solved by the Invention

In the conventional optical recording devices above, recording operations are temporarily suspended partway through recording and test writing is repeated to adjust or optimize the write strategy, but the repetition of test writing prolongs the time required for recording. Therefore, there is a problem in that, in the recording of a broadcast program, if the test writing takes too long, the amount of broadcast program data that must be temporarily stored in a memory buffer in the optical recording device may exceed the memory buffer capacity, leading to data loss.

The present invention addresses the above problem with the object of obtaining an optical recording method and an optical recording device that enable more efficient write strategy correction and optimization.

Means of Solution of the Problems

An optical recording method according to the present invention is an optical recording method for recording information by directing laser light onto an optical recording medium according to a write strategy responsive to recorded data length, the write strategy including a plurality of parameters, the information being recorded by alternate repetition of a recording period in which the information is recorded and a suspension period in which recording is suspended, the optical recording method comprising:

a write strategy correction step for reproducing, during the suspension period, information recorded in the immediately preceding recording period, and correcting a parameter of the write strategy, based on reproduced signal quality; and a recording step for performing recording during the next recording period, using the parameter of the write strategy as corrected in the write strategy correction step;

wherein the write strategy correction step includes a quality measurement step for measuring signal quality of a signal recorded just before, and a write strategy alteration step for altering the write strategy, based on the reproduced signal quality measured in the quality measurement step; and wherein the write strategy is altered just once in the write strategy correction step during one suspension period.

Effect of the Invention

According to the present invention, the suspension period can be shortened because the write strategy parameters are altered only once per suspension period. Lowering of recording quality because of optical recording medium effects, e.g., large optical disc warpage or non-uniform recording characteristics, or effects of temperature changes during recording, can be prevented, however, and recording can be carried out with consistent quality, because the write strategy parameter settings are corrected at periodic setting correction intervals.

BRIEF DESCRIPTION OF THE DRAWINGS

FIGS. 2(a) to 2(c) are diagrams showing exemplary asymmetries of a reproduced signal measured in the reproducing characteristic measurement unit in the embodiments of the invention.

FIG. 3 is a diagram showing an example of the modulation index of a reproduced signal measured in the reproducing characteristic measurement unit in the embodiments of the invention.

FIGS. 4(a) to 4(e) are diagrams illustrating an exemplary write strategy generated in optical disc recording with EFM+ (8-16)-modulation (for DVD) in the optical recording and reproducing apparatus in the embodiments of the invention.

EXPLANATION OF REFERENCE CHARACTERS

100 optical recording and reproducing apparatus, 110 preamplifier, 120 reproduced signal processor, 130 recording quality measurement unit, 140 data decoder, 150 reproducing characteristic measurement unit, 160 data encoder, 170 write strategy control unit, 180 servo control unit, 181 spindle motor, 182 sled motor, 190 buffer memory, 200 central control unit, 210 CPU, 220 ROM, 230 RAM, 300 optical head, 310 semiconductor laser, 320 laser driving unit, 330 collimator lens, 340 beam splitter, 350 objective lens, 360 detector lens, 370 photodetector, 400 host controller, 500 optical disc.

BEST MODE OF PRACTICING THE INVENTION

First Embodiment

Embodiments of the invention will now be described with reference to the drawings.

The optical recording method in the embodiments described below performs mark edge recording (PWM recording). In this method, information is recorded when a recording mark is formed by controlling a semiconductor laser according to a write strategy (a laser emission waveform rule used in recording) to emit light depending on data to be recorded on an optical disc.

Figure 1:
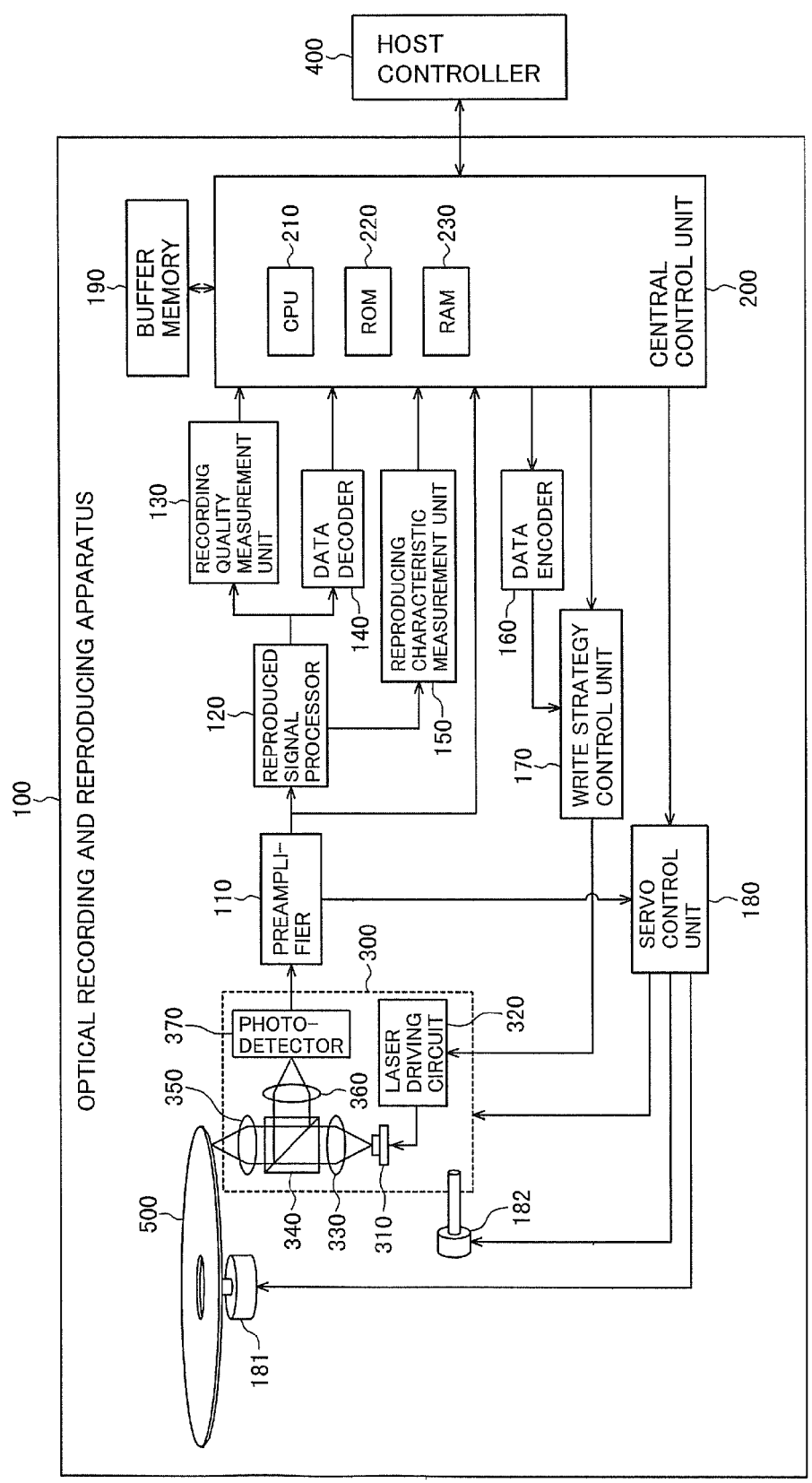
FIG. 1 is a block diagram illustrating an optical recording and reproducing apparatus in embodiments of the invention.

FIG. 1 is a diagram showing an exemplary basic structure of an optical recording and reproducing apparatus 100 according to a first embodiment of the invention. The optical recording and reproducing apparatus 100 in FIG. 1 records EFM+(8-16) modulated data onto an optical disc 500 (e.g., a DVD).

A servo control unit 180 controls a spindle motor 181 for rotating the optical disc 500, a sled motor 182 for moving the position of an optical head 300, and an actuator (not shown) of the optical head 300.

The reproduced signal from the optical head 300 is amplified in a preamplifier circuit 110 and input to a central control unit 200. Address information in the input signal is demodulated in the central control unit 200 to obtain the present position of the optical head 300.

The servo control unit 180 is given the difference of the address information of the position to be accessed (the access position) from the address information obtained for the present position, and controls the sled motor 182 to move the optical head 300 to the access position. The servo control unit 180 also performs focusing and tracking control, based on a servo error signal from the preamplifier 110. The servo control unit 180 further controls the actuator (not shown) of the optical head 300 to control the angle (the angle of the optical axis of the light incident onto the optical disc 500 to the perpendicular to the surface of the optical disc 500, that is, the tilt angle) of the optical head 300 to the disc 500.

In reproducing data, a laser beam emitted from a semiconductor laser 310 and having an output value (reproducing power) required for data reproduction is focused via a collimator lens 330, a beam splitter 340, and an objective lens 350 onto the optical disc 500. Reflected light from the optical disc 500 is separated from the incident light by the beam splitter 340 after passing through the objective lens 350, and received through a detector lens 360 by a photodetector 370.

Of the above components, in the optical system includes the semiconductor laser 310, the collimator lens 330, the beam splitter 340, the objective lens 350, and the detector lens 360; the optical head 300 includes the optical system, the photodetector 370, a laser driving unit 320, and the actuator (not shown).

The photodetector 370 converts the optical signal to an electrical signal. The converted electrical signal obtained by the photodetector 370 is input through the preamplifier 110 to both the central control unit 200 and a reproduced signal processor 120.

The reproduced signal processor 120 equalizes (reshapes) the electrical signal from the preamplifier 110 and inputs the equalized signal to both a recording quality measurement unit 130 and a data decoder 140. The reproduced signal processor 120 also inputs the unequalized signal to a reproducing characteristic measurement unit 150.

The reproducing characteristic measurement unit 150 determines a reproducing characteristic, such as the asymmetry value, modulation index value, or reproduced-signal amplitude value, for the adjustment of recording power required in recording. The recording quality measurement unit 130 measures signal quality, such as the jitter value or error rate of the reproduced signal.

The data decoder 140 binarizes the input reproduced signal and performs demodulation, error correction, and other processing to generate (reproduce) the data recorded on the optical disc 500. The optical recording and reproducing apparatus 100 is connected to a host controller 400; the central control unit 200 stores the generated data in a buffer memory 190, and then sends the data to the host controller 400.

When determining the asymmetry value, the reproducing characteristic measurement unit 150 couples the input electrical signal (the signal output from the preamplifier 110) by AC (alternating current) coupling, and calculates an asymmetry value β based on the AC-coupled electrical signal. Exemplary AC-coupled electrical signals as described above are indicated in FIGS. 2(a) to 2(c). The reproducing characteristic measurement unit 150 detects the peak level A1 and the bottom level A2 of the signals exemplified in FIGS. 2(a) to 2(c). The symmetry value β is calculated from the detected peak level A1 and bottom level A2 by using the following expression (1).

$$\beta=(A1+A2)/(A1-A2) \qquad (1)$$

In this case, the peak level A1 and bottom level A2 occur where the longest space and the longest mark appear alternately, and their values are represented in relation to a zero level equal to the mean value of the peak level and bottom level occurring where the shortest space and the shortest mark appear alternately.

As mentioned above, FIGS. 2(a) to 2(c) show exemplary detected asymmetries of the reproduced signal (the signal output from the preamplifier 110) detected in the reproducing characteristic measurement unit 150: FIG. 2(a) shows a case in which β<0; FIG. 2(b) shows a case in which β=0; FIG. 2(c) shows a case in which β>0.

When determining the modulation index value, the reproducing characteristic measurement unit 150 detects the peak level PK and bottom level BT of the input electrical signal. In this case, differing from the asymmetry value determination, the peak level PK and bottom level BT of the (DC-coupled) signal are detected without AC coupling, and the modulation index is calculated using the following expression (2).

$$\text{Modulation index}=(PK-BT)/PK \qquad (2)$$

FIG. 3 shows an exemplary signal obtained in this way by DC-coupling. As shown, the peak level PK and bottom level BT are referenced to the zero level (the output offset value when the photodetector 370 has no input (no incident light reflected from the optical disc)). The peak PK and bottom BT respectively correspond to the levels of the longest space and longest mark.

In recording data, the central control unit 200 stores data from the host controller 400 in the buffer memory 190; then a data encoder 160 adds an error correction code, modulates the data according to a modulation rule, and generates recorded data according to the format of the optical disc 500. When the data to be recorded are a broadcast program, the data are sequentially sent at regular intervals from the host controller 400 and stored in the buffer memory 190 at the recording rate. The central control unit 200 reads the data out of the buffer memory 190 at appropriate times so as to prevent the data size from exceeding the size of the buffer memory 190, and records the data. When only a small amount of data is stored in the buffer memory 190, the central control unit 200 temporarily suspends the recording operation and waits until at least a prescribed amount of data are stored in the buffer memory 190, so the recording process is performed intermittently.

The write strategy control unit 170 generates a write strategy signal according to the data to be recorded. That is, after the write strategy has been set by the central control unit 200, when given data to be recorded specifying n periods, indicating a mark length, the write strategy control unit 170 outputs a write strategy signal (a signal generated according to the write strategy, having substantially the same waveform as the waveform of the emitted light pulse train) corresponding to the data to be recorded.

The laser driving unit 320 drives the semiconductor laser 310 with driving current corresponding to the generated write strategy signal. A laser beam with an output value (recording power) required for data recording is emitted from the semiconductor laser 310 and focused onto the optical disc 500 by the collimator lens 330, the beam splitter 340, and the objective lens 350. A mark is thereby formed, and a recorded portion is formed consisting of marks and spaces positioned between the marks.

FIGS. 4(a) to 4(e) show exemplary write strategy signals generated by the write strategy control unit 170 in the optical recording and reproducing apparatus 100 shown in FIG. 1. FIG. 4(a) shows exemplary data to be recorded, consisting of marks MA and spaces SA; FIG. 4(b) shows the marks MK and the spaces SP positioned between the marks that are formed when the data in FIG. 4(a) are recorded on the optical disc 500. The EFM+(8-16) modulated recorded data can have lengths corresponding to from n=3 periods or 3T for recording a minimum-length mark to n=11 periods or 11T, or a length corresponding to n=14 periods or 14T for recording a maximum-length mark.

FIGS. 4(a) to 4(e) assume the case in which a minimum-length mark or 3T mark is recorded, then a next shortest mark or 4T mark is recorded, and then a fourth shortest mark or 6T mark is recorded.

FIG. 4(c) show an exemplary write strategy signal generated in the write strategy control unit 170 when the data are recorded onto a rewritable recording medium (e.g., a DVD-RW) optical disc 500. FIGS. 4(d) and 4(e) show exemplary write strategy signals generated in the write strategy control unit 170 when the data are recorded onto a write-once recording medium (e.g., a DVD-R) optical disc 500. The write strategy signal in FIG. 4(d) is used for low speed recording (1× to 4× speeds, for example); the write strategy signal in FIG. 4(e) is used for high speed recording (4× or higher speeds, for example).

In order to generate write strategy signals like those in FIGS. 4(c) to 4(e) in the write strategy control unit 170, a plurality of write strategy parameters must be set, which complicates the waveforms of the write strategy signals, leading to a proliferation of types.

The central control unit 200 controls the optical recording and reproducing apparatus 100 as a whole in reproducing and writing data; it receives jitter and other recording quality indexes from the recording quality measurement unit 130, asymmetry values and modulation index values from the reproducing characteristic measurement unit 150, and reproduced data from the data decoder 140, and gives control signals to the data encoder 160, write strategy control unit 170, laser driving unit 320, and servo control unit 180.

The central control unit 200 also performs a write strategy correction that will be described later with reference to FIGS. 6 to 20; in particular, it executes the write strategy correction, sets the intervals at which the write strategy settings are corrected, calculates reproducing characteristics such as asymmetry values, measures signal quality, performs test writing, suspends and resumes data recording, and so on.

The central control unit 200 includes, for example, a CPU 210, a ROM 220 storing programs for operating the CPU 210, and a RAM 230 for storing data. The programs stored in the ROM 220 include parts that correct the write strategy and define the intervals at which the write strategy is corrected, as described later with reference to FIGS. 8 and 9, or FIGS. 15 and 16.

As the ROM 220, it is preferable to use EEPROM or another type of rewritable memory, for a reason described later.

Figure 5:
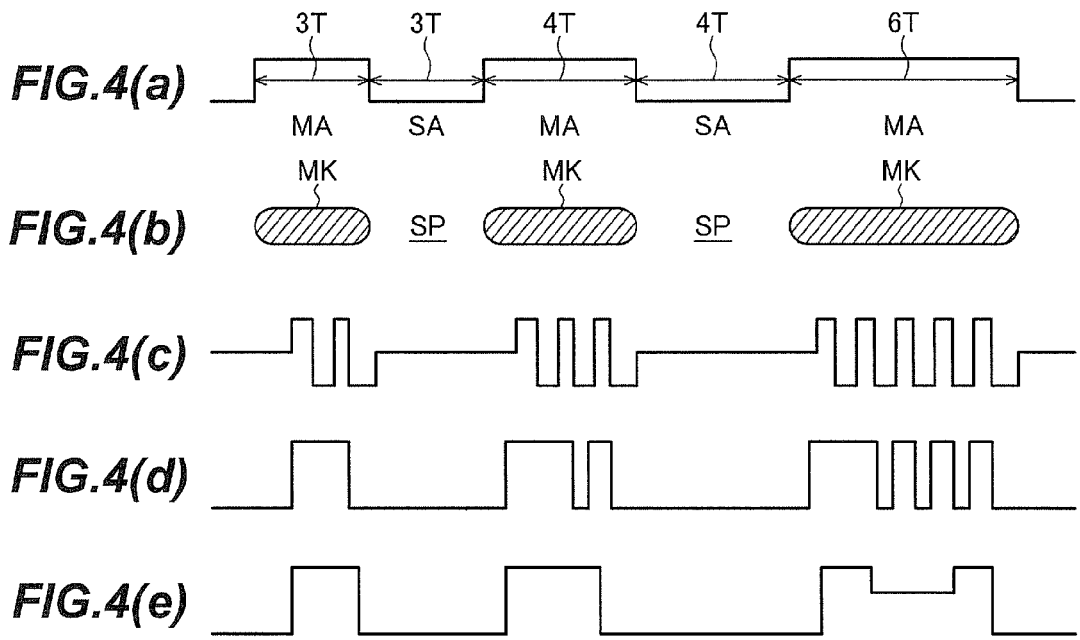
FIG. 5 is a diagram showing an exemplary list of write strategies held by the optical recording and reproducing apparatus in the embodiments of the invention.

In general, the optical recording and reproducing apparatus 100 has a list of write strategies, corresponding to the IDs of optical discs 500, held in the central control unit 200 (in the ROM 220, for example). Asymmetry values and modulation index values that provide target values for power adjustment are also held in the list of write strategies. FIG. 5 shows an exemplary list of write strategies. The ID of an optical disc 500 is preset by the manufacturer of the optical disc 500 and is recorded on the optical disc 500 (in the lead-in area, for example) as disc-specific information.

The optical recording and reproducing apparatus 100 reads the ID of an inserted optical disc 500, then reads the write strategy values corresponding to the ID in the write strategy list in FIG. 5, and uses these values for recording onto the optical disc 500.

Some optical recording and reproducing apparatus 100 may not hold the write strategy list shown in FIG. 5, but may use recommended write strategy values included in the disc-specific information of the optical disc 500 or use values calculated from the recommended write strategy values by use of a preset formula.

In general, recording power is optimized by test writing before information is recorded. This procedure will be described below.

First, test writing is performed on the optical disc 500 by recording, for example, a random data pattern while varying the recording power; next the region of the optical disc 500 in which the test pattern is recorded is reproduced; then the asymmetry value is detected by the reproducing characteristic measurement unit 150, and the detected asymmetry value is compared with a target asymmetry value to obtain the optimum recording power.

In general, as the recording power is increased, the asymmetry value increases; as the recording power is reduced, the asymmetry value decreases. Asymmetry values are often used to optimize the recording power in write-once optical recording media; modulation index values are often used in rewritable discs. Modulation index values, in general, also increase as the recording power is increased, and decrease as the recording power is reduced.

In the central control unit 200, the detected asymmetry values corresponding to a plurality of different recording powers are compared with the target value, and the recording power that generated the detected value nearest to the target value is set as the optimum recording power.

Alternatively, the optimum value may also be obtained by performing test writing onto the optical disc 500 with a single recording power, then performing reproduction, detecting the asymmetry value from the reproduced result, comparing the detected asymmetry value with the target asymmetry value, and increasing or reducing the recording power depending on the comparison result. In general, asymmetry values are used for write-once discs (DVD-R, etc.). Modulation index values are often used for rewritable discs (DVD-RW, etc.) instead of asymmetry values.

A procedure for the optical recording method in this embodiment will now be described with reference to FIG. 6.

First, when the optical disc 500 to be used in recording is inserted in the optical recording and reproducing apparatus 100, a sensor (not shown) detects this (step S10) and notifies the central control unit 200, and the central control unit 200 drives the optical head 300 via the servo control unit 180, thereby adjusting the servo conditions and the tilt angle with respect to the optical disc 500 (step S11).

Next, in step S12, disc-specific information such as the ID information (identification information) and the recommended write strategy values prerecorded by the disc manufacturer are read from the optical disc 500.

Next, in step S13, the list of write strategies stored in the central control unit 200 (e.g., in the ROM 220) is searched to find the settings of the write strategy corresponding to the ID information that was read, and these values are set in the central control unit 200 (e.g., in the RAM 230) as the recording write strategy. When there is no write strategy (stored in the central control unit 200) corresponding to the read ID information, recommended write strategy values read from the optical disc 500 may be set.

A write strategy determined by using the values read from the optical disc 500 and a formula preset in the optical recording and reproducing apparatus 100 may also be set. The parameters to be set as the write strategy also include an asymmetry value $\beta$ or a modulation index value to be used as a target value for recording power optimization.

Then, when a record command is given by a means not shown in the drawings (step S14), in step S15, the write strategy set in this way and the target value (asymmetry value $\beta$ or modulation index) for recording power optimization are used to perform test writing on the optical disc 500. That is, the write strategy control unit 170 sets the write strategy that has been set in the central control unit 200 in step S13, thereby generates a write strategy based on a test pattern, and performs test writing onto the optical disc 500 by using the optical head 300. The area on the optical disc 500 on which the test pattern has been recorded is reproduced in the optical head 300, the reproducing characteristic (the asymmetry value or the modulation index) detected by the reproducing characteristic measurement unit 150 is compared with the target value for recording power optimization set in step S13 in the central control unit 200, and control is performed to make the two values match, whereby the optimum recording power is determined.

Finally, in step S16, using the write strategy set in step S13 and the recording power set in step S15, the writing of original data (original writing) onto the optical disc 500 begins.

Of the above processes, the process in step S10 is performed by the central control unit 200 and a sensor (not shown) for detecting the insertion of an optical disc, the process in step S11 is performed by the optical head 300, preamplifier 110, servo control unit 180, and central control unit 200, the process in step S12 is performed by the optical head 300, servo control unit 180, preamplifier 110, reproduced signal processor 120, data decoder 140, and central control unit 200, the process in step S13 is performed by the central control unit 200, the process in step S14 is performed by the central control unit 200 and a means (not shown) for receiving a record command, the process in step is performed by the servo control unit 180, preamplifier 110, and optical head 300, and the data recording process in step S16 and the following steps is performed by the central control unit 200, data encoder 160, write strategy control unit 170, servo control unit 180, and optical head 300.

Figure 6:
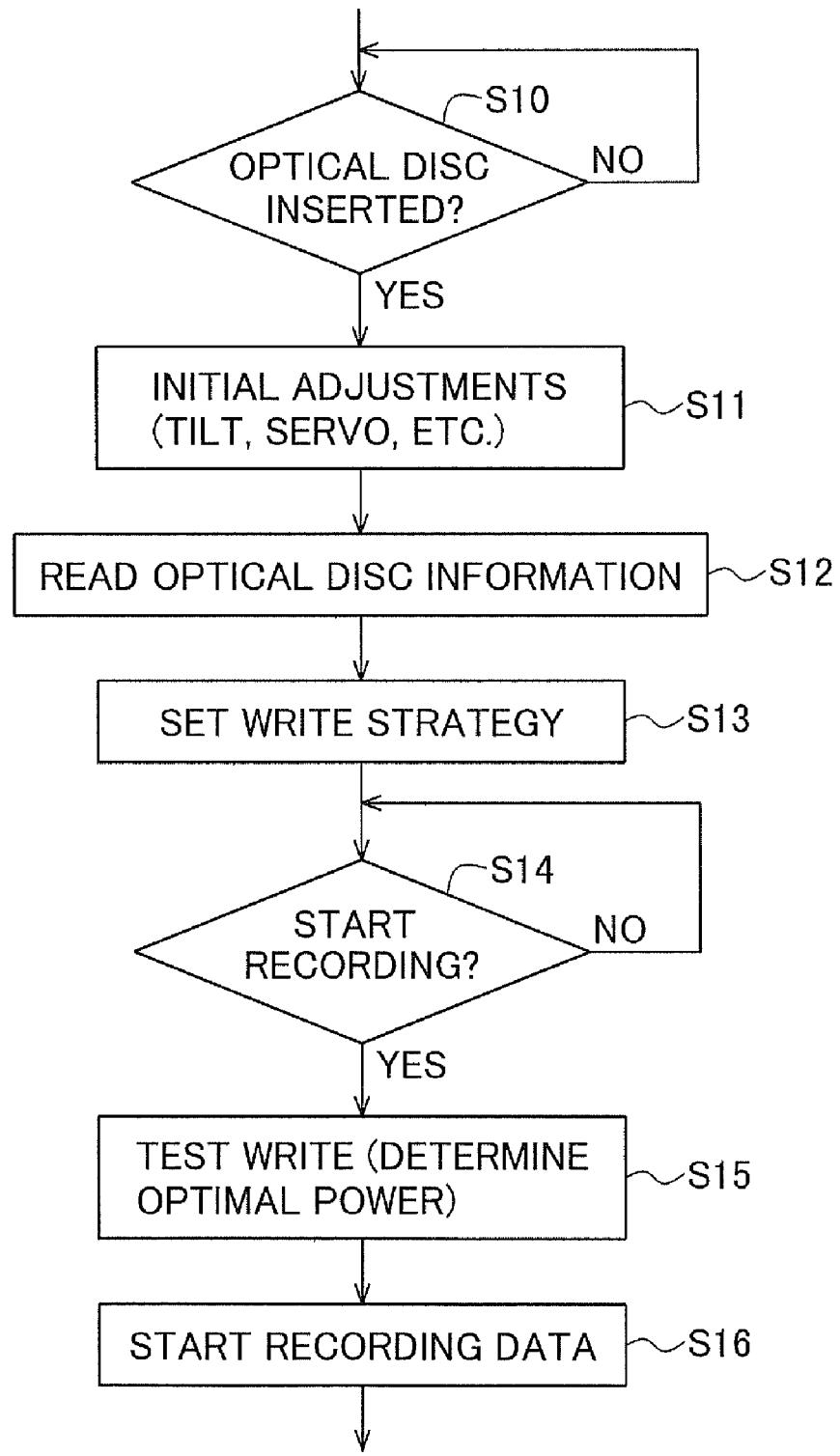
FIG. 6 is a flowchart illustrating an exemplary recording procedure in the optical recording and reproducing apparatus in a first embodiment of the invention.
Figure 7:
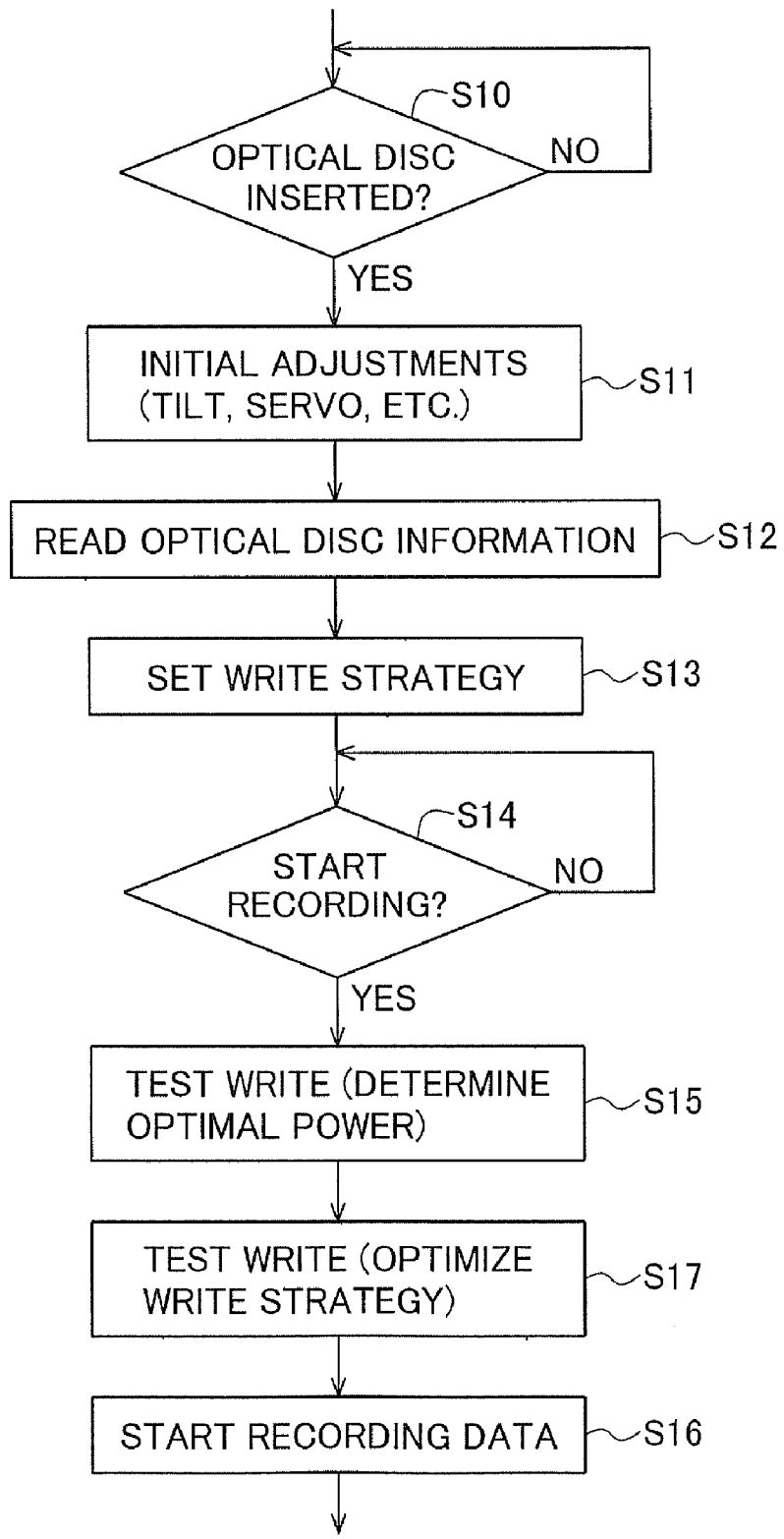
FIG. 7 is a flowchart illustrating another exemplary recording procedure in the optical recording and reproducing apparatus in the first embodiment of the invention.

In FIG. 6, the write strategy set in step S13 is used for recording in step S16 and the following steps, but as shown in FIG. 7, test writing may be repeated in step S17 to optimize the write strategy. This optimization may be only a rough adjustment that can be carried out within a required recording time limit (sufficient for recording and reproducing not to end in failure). Alternatively, this optimization may not be performed, but several prepared write strategy candidates may be test written and the best write strategy may be selected from among them.

Figure 8:
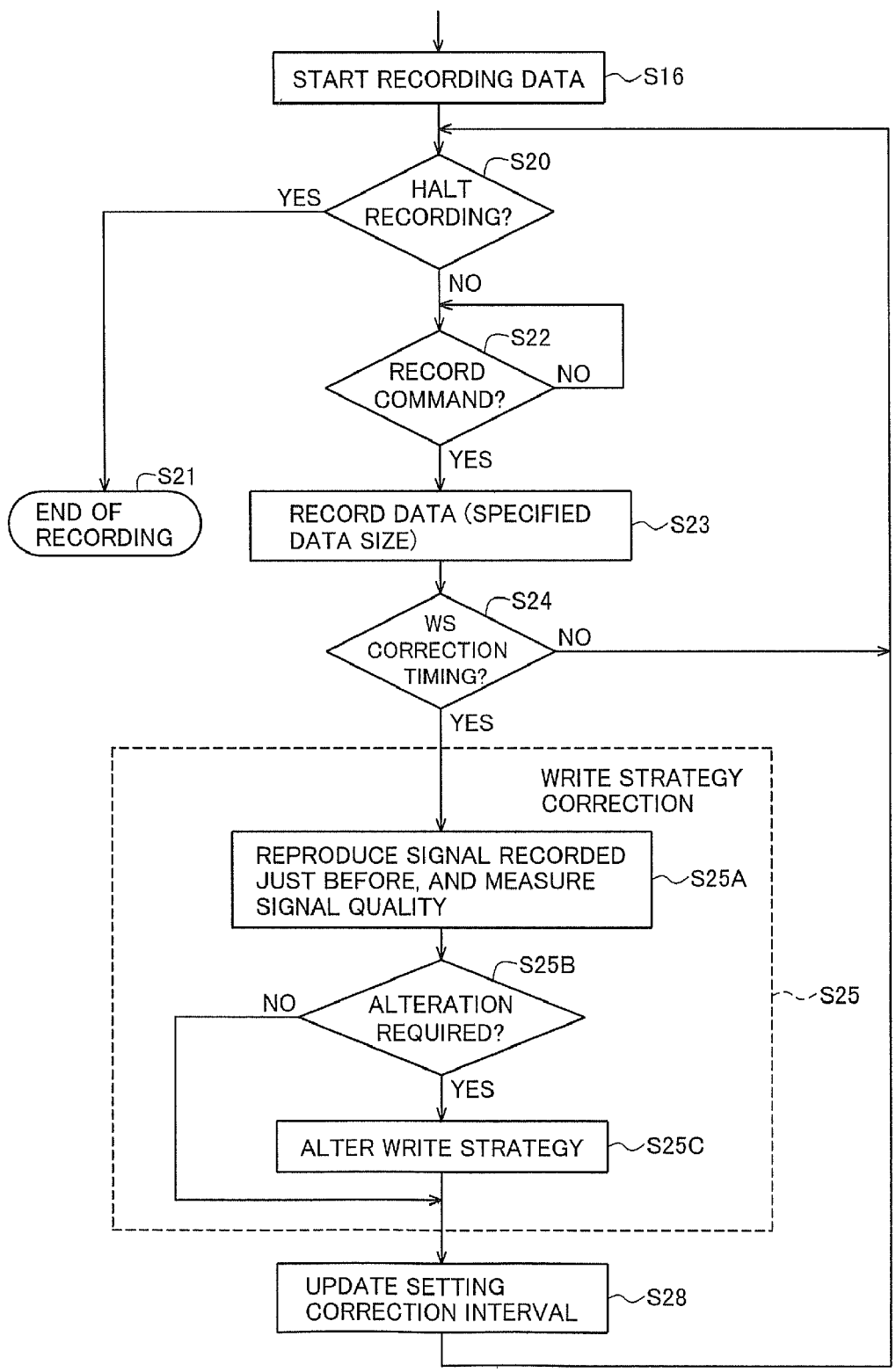
FIG. 8 is a flowchart illustrating an exemplary write strategy correction procedure in the optical recording and reproducing apparatus in the first embodiment of the invention.

FIG. 8 illustrates the process in step S16 and the following steps in FIG. 6 or 7 in more detail. It is assumed that the data to be recorded are supplied at a prescribed transmission rate, as in a broadcast program. In this case, in order to prevent overflow or underflow of the buffer memory 190, it is necessary to control the amount of data to be recorded that are stored in the buffer memory 190. Accordingly, recording periods, in which a prescribed amount of data is read out of the buffer memory 190 and written onto the optical disc 500, alternate with waiting periods, in which the operations for recording on the optical disc 500 are suspended until a prescribed amount of data or more is stored in the buffer memory 190 (waiting for the time when the amount of data in the buffer memory 190 reaches the prescribed value or more). Since recording (recording onto the optical disc 500) and standby (suspension of the recording onto the optical disc 500) are repeated in this way, this process may also be termed intermittent recording (onto the optical disc 500). As will be described in detail below, among the recording suspension periods in this intermittent recording, the write strategy is corrected in a suspension period matching a correction timing (the first suspension period occurring, after the elapse of a set time).

In step S20, whether or not a recording halt command is being given by a means not shown in the drawings is determined, and if the recording halt command is given (if YES), data recording ends (step S21). If the recording halt command is not given (if NO), a record command from the central control unit 200 is awaited in step S22. The central control unit 200 controls the amount of data to be recorded and the record start timing so that the amount of data stored in the buffer memory 190 does not vanish (to less than a lower limit amount) or exceed the size of the buffer memory 190 (exceed an upper limit amount). When a record command is given from the central control unit 200, in step S23, data of a size specified by the central control unit 200 are recorded onto the optical disc 500.

After the completion of recording, whether or not the write strategy (WS) correction timing has been reached is decided in step S24. The decision as to whether or not the write strategy correction timing has been reached is made according to whether or not a setting correction interval has elapsed from the start of recording or from the preceding correction of the write strategy.

The phrase 'from the start of recording or from the preceding correction of the write strategy' means 'after the preceding (latest) correction of the write strategy (the process in step S25) has been performed' if the write strategy process (in step S25, described later) has been carried out even once after the start of the recording, and 'from the start of recording' if the correction of the write strategy (the process in step S25) has not yet been performed even once after the start of recording.

The setting correction interval is determined from, for example, the amount of data written onto the optical disc. In this case, whether the correction timing has been reached or not is determined by comparing the size of the data that have been recorded from the start of recording or from the preceding correction of the write strategy up until the present time with a data size that has been set for determining the correction interval.

In this determination, if the write strategy correction timing has not been reached yet (if NO), the operation returns to step S20. If the write strategy correction timing has been reached (if YES), the write strategy correction process in step S25 is performed.

In the write strategy correction process (S25), first the process in step S25A is performed.

In step S25A, the signal that was recorded just before in step S23 is reproduced and the quality (jitter value, error rate, etc.) of the reproduced signal is measured. The area from which the signal is reproduced must be at least large enough for measurement of the signal quality.

Next, in step S25B, from the signal quality that was measured in step S25A, whether or not it is necessary to alter the write strategy is determined. If no alteration is necessary, the process proceeds to step S28. If an alteration is necessary, the process proceeds to step S25C.

Next, in step S25C, a write strategy setting value that has been set in the central control unit 200 (e.g., in the RAM 230) is varied by just one step (when the setting value is represented by a digital signal, this is the width that varies the least significant digit by just 1). This alteration is performed on the basis of the signal quality measured in step S25A, the parameter value at the preceding write strategy alteration, the direction of the preceding write strategy alteration, and other factors.

Next, in step S28, if the signal quality that was measured in step S25A is bad (for example, the index indicating the signal quality is worse than a prescribed value (a first prescribed value)), the setting correction interval is shortened; if the signal quality that was measured in step S25A is good (for example, the index indicating the signal quality is worse than a prescribed value (a second prescribed value)), the setting correction interval is lengthened.

In this example, the setting correction interval is assumed to be defined or specified by the amount of data written onto the optical disc, but it may alternatively be defined or specified by the radial displacement (radial displacement from the position at which the previous correction was performed) of the portion of the optical disc 500 on which the data are recorded.

Many optical discs 500 have large warpage at their outer circumferences and some optical discs 500 may have non-uniform recording characteristics, so in addition to the setting of a setting correction interval based on signal quality as described above, the setting correction interval of the write strategy may be lengthened near the inner circumference and shortened near the outer circumference. In this case, for example, a radial position detection means or process for detecting the radial position of the part of the optical disc onto which information is recorded is added; if the radial position detected by the radial position detection means or process is on the inner circumference side (recording is currently being performed at a position closer to the inner circumference than a prescribed position on the optical disc), the setting correction interval determined from the quality of the reproduced signal that was measured in the quality measuring process (S25A) is lengthened; if it is on the outer circumference side (recording is currently being performed at a position closer to the outer circumference than a prescribed position on the optical disc), the setting correction interval determined from the quality of the reproduced signal that was measured in the quality measuring process is shortened.

Furthermore, since recording performance may be affected by temperature changes, the internal temperature of the optical recording and reproducing apparatus 100 may be measured, and the correction interval of the write strategy settings may be adjusted in response to the temperature. In this case, for example, a temperature detection means or process for detecting temperature differences from when recording onto the optical disc began is added, and if the temperature difference detected by the temperature detection means or process becomes equal to or greater than a prescribed value, the setting correction interval determined from the quality of the reproduced signal that was measured in the quality measuring process (S25A) is shortened.

At the start of data recording, in order to perform the initial recording quality measurement quickly, an initial value (initial setting of the correction interval) may be stored in the central control unit 200 (e.g., RAM 230) so as to shorten the setting correction interval from the start of recording to the first correction, or the central control unit 200 may force the setting correction interval to a short value (e.g., the shortest setting correction interval) at the start of recording.

After the setting correction interval is updated in step S28, the procedure returns again to step S20 to repeat the same operations.

Write strategy correction is repeated at the correction interval set in step S28 in this way. The steepest descent method with a signal quality index as an argument (variable) may be used as the write strategy optimization method, or the write strategy parameter to be altered and the direction of the alteration may be determined by learning. A write strategy alteration priority may be preset and alterations may be carried out in the preset order. Write strategy correction (the process in S25), however, is carried out only once during one suspension period, and in a single processing of step S25C, the write strategy is altered only once (if necessary, or not altered at all); the write strategy is not altered multiple times every time step S25C is executed.

If write strategy correction were to be carried out a plurality of times in the processing of step S25C, test recording would have to be carried out the same number of times as the number of the write strategy corrections, which could complicate the management of the buffer memory 190 to keep it supplied with recording data, and when the ratio of the length of the suspension period to the length of the recording period is small, management of the buffer memory 190 could fail (causing an overflow or underflow of the buffer memory 190).

Limiting the process in step S25C to only one write strategy correction eliminates the need for test recording (the following recording is effectively equivalent to test recording), and accordingly the buffer memory 190 can be managed just as in the conventional case in which no write strategy correction is carried out.

In write strategy correction, by carrying out corrections in only one-step increments (one-step increments or no alteration at all; that is, no alteration exceeding one step is carried out), even if an alteration is made in a direction that worsens the signal quality, the quality is not abruptly degraded to such a degree that recording and reproducing operations fail.

Although the write strategy correction is carried out in single steps, a maximum alteration step width may be preset in the central control unit 200 (e.g., in the RAM 230) for write strategy parameters having little impact on signal quality, and the write strategy may be altered within the range of the maximum step width.

In order to prevent sudden degradation of signal quality, a write strategy parameter for which even a single-step write strategy alteration has a large impact on signal quality may be left unaltered in step S25C. For example, the relationship between write strategy alteration and the impact the alteration has on the jitter value of the reproduced signal, for example, may be tested in advance, and write strategy parameters that have such a large impact that even a single-step alteration causes a 2% or more variation in the jitter value of the reproduced signal may be left unaltered in step S25C. In compensation, when the write strategy is optimized by test writing in step S17, write strategy parameters having a large impact are preferably given priority for adjustment.

The write strategy is corrected at each write strategy setting correction interval as described above, but optical recording and reproducing apparatus 100 may correct the recording power, generally by using running optimum power control (ROPC). The methods used in ROPC include use of light reflected from the optical disc 500 during recording and control by use of, for example, the asymmetry value of a signal reproduced after recording, etc. The method using reflected light during recording may be carried out concurrently with recording and reproducing operations; the method using a signal reproduced after recording requires a timing adjustment to prevent overlap with write strategy correction operations.

Figure 9:
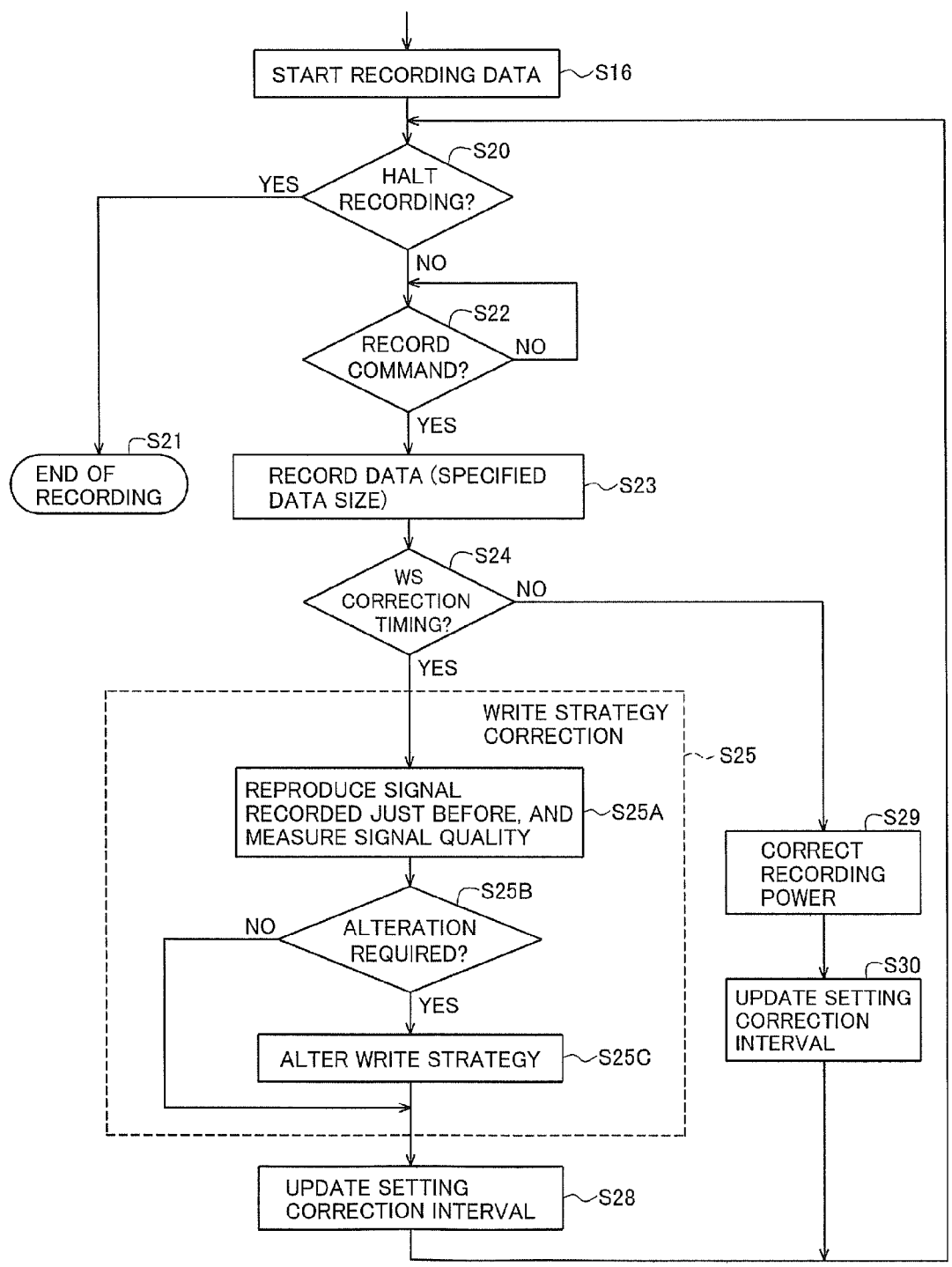
FIG. 9 is a flowchart illustrating another exemplary write strategy correction procedure in the optical recording and reproducing apparatus in the first embodiment of the invention.

An example in which ROPC is carried out using a signal reproduced after recording is shown in FIG. 9. If the write strategy setting correction interval has not elapsed and accordingly the correction timing has not been reached (if NO) in step S24, ROPC is activated as a recording power correction process in step S29.

If the correction timing has been reached (if YES) in step S24, when the setting correction interval is updated in step S28, the central control unit 200, which carries out the process in step S24, may also be set to force the strategy correction timing decision result in the following step S24 (the decision result the next time the decision on the strategy correction timing is made in step S24) to be NO. For example, if the decision as to whether the write strategy correction timing has been reached or not is carried out by comparing the size of the data recorded from the preceding write strategy correction up to the present time with a preset data size that specifies the setting correction interval, the data size that specifies the setting correction interval may be set to a rather large value (for example, the maximum value in the range of values by which the data size is expressed), after which the decision in the following step S24 is carried out. In this case, it is necessary to update the correction interval (S30) to return the following setting correction interval to its ordinary value after the process in step S29 is carried out. In this way, even when the setting correction interval is short, recording power correction processing and write strategy correction are carried out alternately (during one suspension period, one of the write strategy correction (S25) and the recording power correction (S29) is carried out, and during the following suspension period, the other one of the write strategy correction (S25) and the recording power correction (S29) is carried out).

In the above example, only one of the write strategy correction (S25) and the recording power correction (S29) is carried out during one suspension period, but both of them may be carried out if there is enough time.

In the example shown in FIG. 9, the write strategy correction and recording power correction (ROPC) are carried out alternately, but situations are contemplated in which an adequate correction cannot be made by just one ROPC recording power correction. Since the write strategy correction is carried out on the basis of the signal quality of the signal recorded just before, it must be carried out with optimally controlled recording power.

Figure 10:
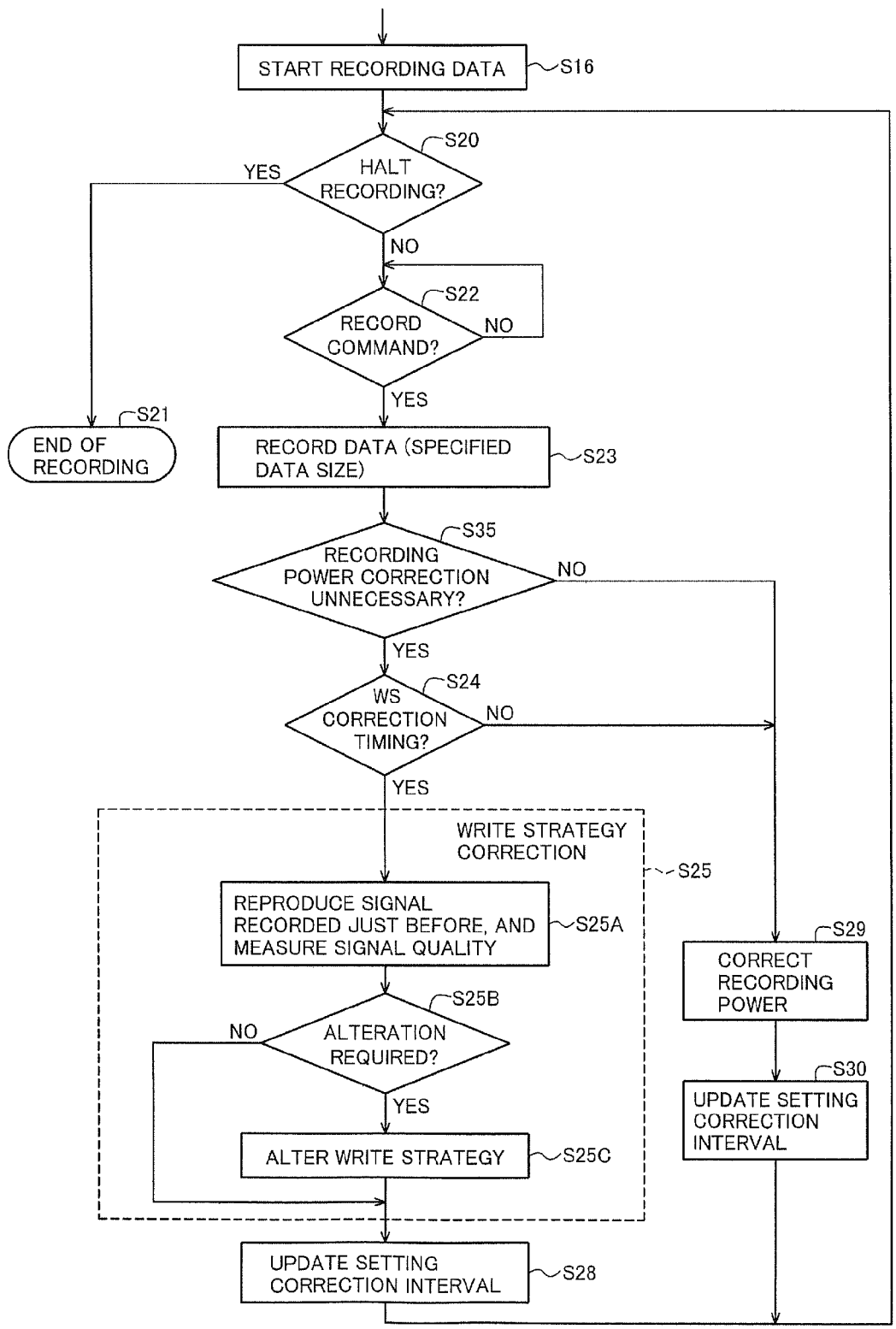
FIG. 10 is a flowchart illustrating another exemplary write strategy correction procedure in the optical recording and reproducing apparatus in the first embodiment of the invention.

An example in which the write strategy is corrected in a state in which the recording power is optimally controlled by the ROPC recording power correction will be shown in FIG. 10. Except for the process in step S35, which is carried out between steps S23 and S24, the processing is the same as in FIG. 9 and will not be described.

In step S35, whether a sufficient ROPC recording power correction has been carried out or not is determined. Whether the ROPC recording power correction is sufficient or not is determined from whether the difference between a reproducing characteristic (asymmetry value or modulation index) of the signal recorded just before and a target value is within a preset tolerance value or not; if the difference is within the tolerance value, a recording power correction is deemed unnecessary; if the difference is out of tolerance, a recording power correction is deemed necessary.

If it is determined that the recording power correction is insufficient (if NO) in step S35 and a recording power correction is necessary, ROPC is run as the recording power correction process in step S29.

When it is determined that a recording power correction is unnecessary (if YES) in step S35, whether or not the write strategy correction timing has been reached is decided in step S24.

If the write strategy correction timing has not been reached (if NO) in step S24, ROPC is run as the recording power correction process in step S29; if the write strategy correction timing has been reached (if YES) in step S24, the write strategy is corrected in step S25.

When step S24 decides that the write strategy correction timing has not been reached, since step S35 has determined that a recording power correction is unnecessary, the processing in steps S29 and S30 may be omitted.

Figure 11:
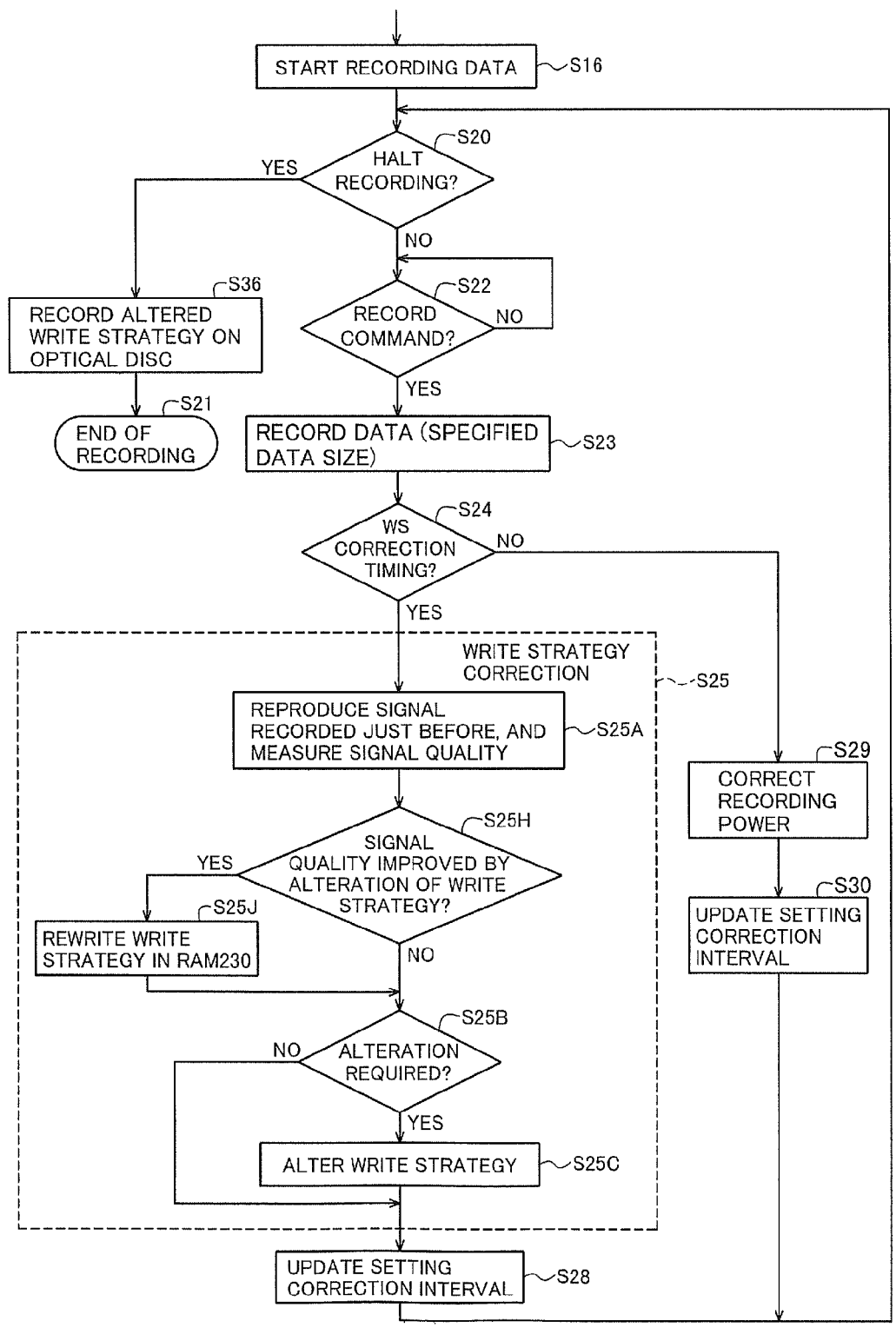
FIG. 11 is a flowchart illustrating yet another exemplary write strategy correction procedure in the optical recording and reproducing apparatus in the first embodiment of the invention.

When a recording halt is recognized (YES) in step S20, data recording ends. The processing of the write strategy, which has been altered by the write strategy alteration process in step S25C, that is performed at this time (preceding the end process S21) will be described with reference to FIG. 11. FIG. 11 is generally the same as FIG. 9 except for the following points.

When the signal is reproduced in step S25A and a good result is obtained from the signal quality measurement, the values of the write strategy as altered by the write strategy alteration in the last preceding execution of step S25C (accordingly, the write strategy values producing the good signal quality) are recorded in a portion of the recording management region on the optical disc (S36). A DVD disc, for example, has a management region in the inner circumference lead-in area of the optical disc, in which recording conditions etc. are recorded, and the altered write strategy values are recorded in some part of this management region as the write strategy correction values. When additional data are written onto the optical disc 500 later, the altered write strategy values (corrected write strategy values) that have been recorded are read from the optical disc 500 in step S12 instead of the recommended write strategy values, and the write strategy values that are read are set in step S13.

In order to carry out this process (the process in step S36), the write strategy as altered in step S25C is held in the central control unit 200 (for example, in the RAM 230) and then the signal quality measured in step S25A is held in the central control unit 200 (for example, in the RAM 230). Whether the signal quality measured in the following step S25A is better than the signal quality held in the central control unit 200 is determined (S25H); if it is determined to be better (YES in S25H), the signal quality and write strategy values held in the central control unit 200 are updated. That is, the signal quality measured in step S25A is written as a new value and the write strategy value as altered by the process in step S25C the time before step S25A was carried out is rewritten as a new value (S25J). When the signal quality measured in step S25A is worse than the signal quality held in the central control unit 200 (NO in S25H), the signal quality and write strategy are not updated. (Accordingly, the previous values are retained.) As described above, the RAM 230 functions as a means for holding an altered write strategy.

Then, when a recording halt is recognized in step S20, the write strategy values held in the central controller are recorded in part of the recording management region on the optical disc (S36).

The write strategy values need not necessarily be recorded in the recording management region; they may be recorded in a region in which write strategy recording is permitted by the specifications of the optical disc 500. If automatic finalizing processing is performed and it is known that no more writing will be carried out on the optical disc 500, the altered write strategy values need not be recorded on the optical disc 500.

Figure 12:
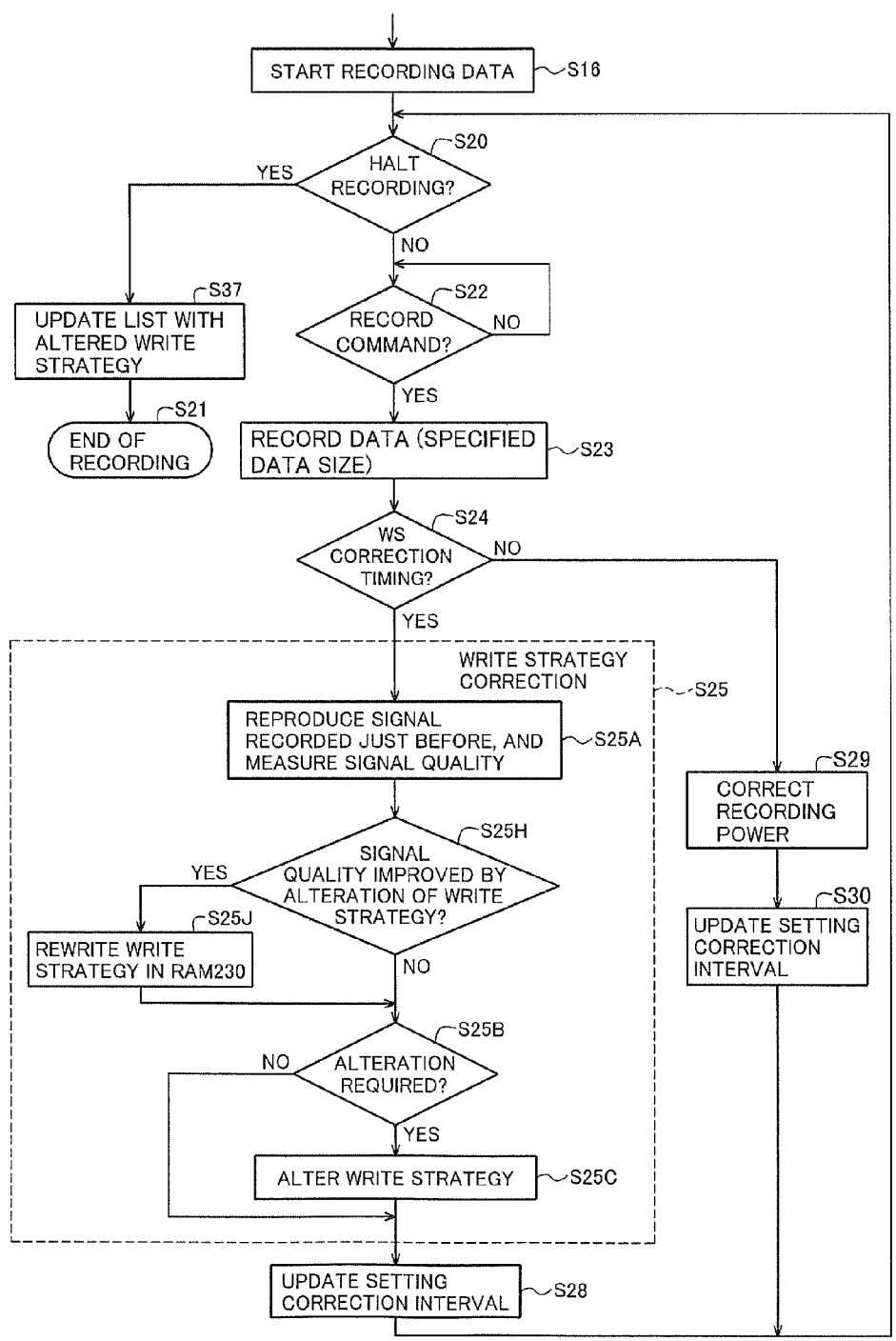
FIG. 12 is a flowchart illustrating yet another exemplary write strategy correction procedure in the optical recording and reproducing apparatus in the first embodiment of the invention.

The processing when the write strategy at the start of recording was read from a write strategy list (a list corresponding to the IDs of optical discs 500) held in the central control unit 200 (for example, in the EEPROM 220) and set in the RAM 230 in step S13 is as shown in FIG. 12; if the recording quality produced by the write strategy as altered by the write strategy alteration in step S25C is better than the recording quality produced by the write strategy at the start of recording (the recording quality that was first measured after the start of recording in step S25A), the list is updated.

In this case, the write strategy in the RAM 230 is written in step S25J, and when recording halts (YES in S20), the list in the EEPROM 220 is rewritten (S37).

When the recording quality at the start of recording (the recording quality first measured after the start of recording in step S25A) is good (for example, when the jitter value is 8% or less), however, the list need not be updated. In other words, the list may be updated only when the quality of the signal that was recorded by using the write strategy parameters recorded in the list is worse than a preset value.

If the write strategy was optimized in step S17, the recording performance produced by the write strategy that was optimized in step S17 is compared with the recording performance produced by the write strategy as altered in step S25C, and the list is similarly updated. If the recording quality produced by the write strategy at the start of recording (the write strategy optimized in step S17) is good, however, the write strategy values in the list are updated to the write strategy values as optimized in step S17.

When the ID of the optical disc 500 is not listed in the list and the recording quality produced by the write strategy at the start of recording is better than the recording quality produced by the write strategy as altered by the write strategy alteration in step S25C, the altered write strategy values are added to the list together with the ID of the optical disc 500.

The above recording or updating of the altered write strategy on the optical disc or the updating of the list in the EEPROM 220 are not necessarily carried out only after it is decided that recording onto the optical disc has stopped (after a YES decision in step S20); the altered write strategy may be recorded or updated, for example, every time a prescribed amount of the recording data is recorded, or when the radial position at which the recording is carried out on the optical disc 500 reaches a prescribed position.

As described above, in the first embodiment, the write strategy is altered (if necessary) at every specified setting correction interval, so in the intermittent recording of broadcasting programs, the write strategy can be altered by effectively using the suspension periods in which recording onto the optical disc is suspended. Because the write strategy correction (the process in S25) is carried out only once in a single suspension period and the write strategy is altered only once in a single write strategy alteration process (S25C), even if the suspension period in the intermittent recording is short, the write strategy can be corrected without causing a data crash in the buffer memory 190 (without causing overflow or underflow of the buffer memory 190). In addition, the timing of the write strategy corrections is changed according to the signal quality level, which eliminates the need to perform more corrections than necessary, reducing the load on the central control unit 200 in the optical recording and reproducing apparatus 100.

Second Embodiment

A procedure will now be described for the optical recording method in the second embodiment. In the second embodiment, in addition to the write strategy correction and recording power correction (ROPC) in the first embodiment, a tilt correction is performed.

The surface of an optical disc 500 is generally warped at the outer circumference and is often slightly cup-shaped. Therefore, in recording and reproducing data, it is necessary to adjust the tilt angle of the optical head 300 responsive to the radial position of the optical disc 500 so that the laser beam from the objective lens 350 is directed perpendicularly onto the optical disc 500. Data reproducing performance in particular deteriorates greatly as the tilt angle departs from its optimal value.

In the present invention, the write strategy is corrected according to the reproducing performance of the signal recorded just before, so if the reproducing performance degrades due to the departure of the tilt angle from its optimal value, the write strategy correction cannot be performed correctly.

If a tilt sensor for sensing the angle made with the optical disc 500 is mounted on the optical head 300, the tilt angle can be optimally controlled responsive to the output from the tilt sensor; without the tilt sensor, the tilt angle requires constant optimal adjustment.

When there is no tilt sensor in the optical head 300, a method frequently used is to optimize the tilt angle at two or more points radial points in the range from the inner circumference to the outer circumference and interpolate; when the optical disc 500 is a blank disc on which no data have been recorded, a method frequently used is to adjust the tilt angle to maximize the amplitude of a servo error signal generated in the servo control unit 180. In some optical discs 500, however, the tilt angle that maximizes the amplitude of the servo error signal is not necessarily equal to or even close to the tilt angle at which the reproducing performance is optimized, and this may adversely affect write strategy correction.

The second embodiment addresses cases in which the tilt angle is not optimally adjusted.

Figure 13:
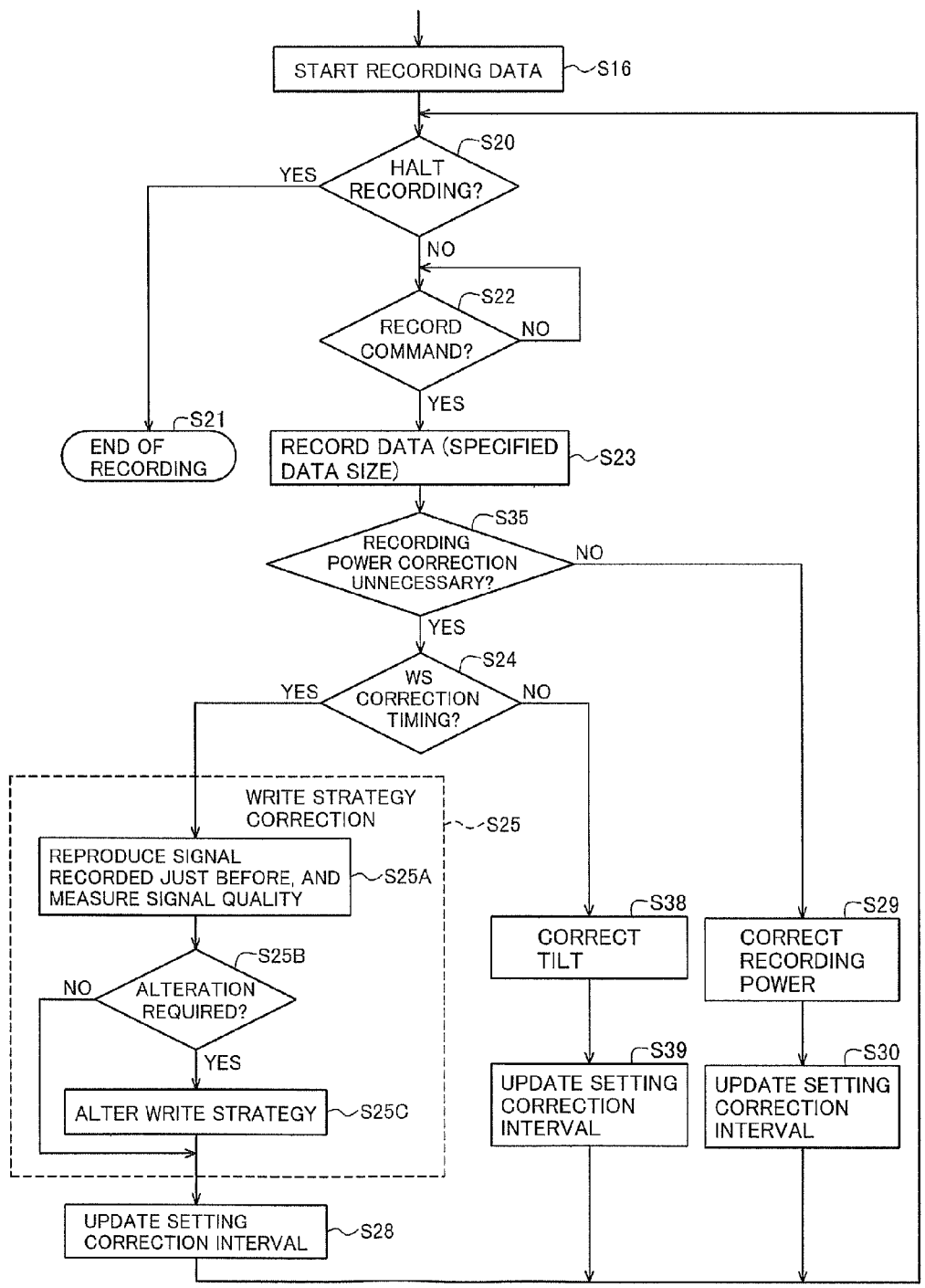
FIG. 13 is a flowchart illustrating another exemplary write strategy correction procedure in the optical recording and reproducing apparatus in the first embodiment of the invention.

FIG. 13 illustrates the write strategy correction method in the second embodiment. The processes preceding the start of data recording in step S16 in FIG. 13 are omitted because they are the same as in FIG. 6 or 7. FIG. 13 is generally the same as FIG. 10, except for the processing when a NO decision is made in step S24. The processing in that case will now be described.

If the write strategy correction timing has not been reached (if NO) in step S24, a tilt correction is carried out in step S38 and the setting correction interval is updated in step S39. The processing in step S39 is the same as the processing in step S28 and step S30, so descriptions will be omitted.

The setting correction interval need not necessarily be controlled, but may be fixed.

Figure 14:
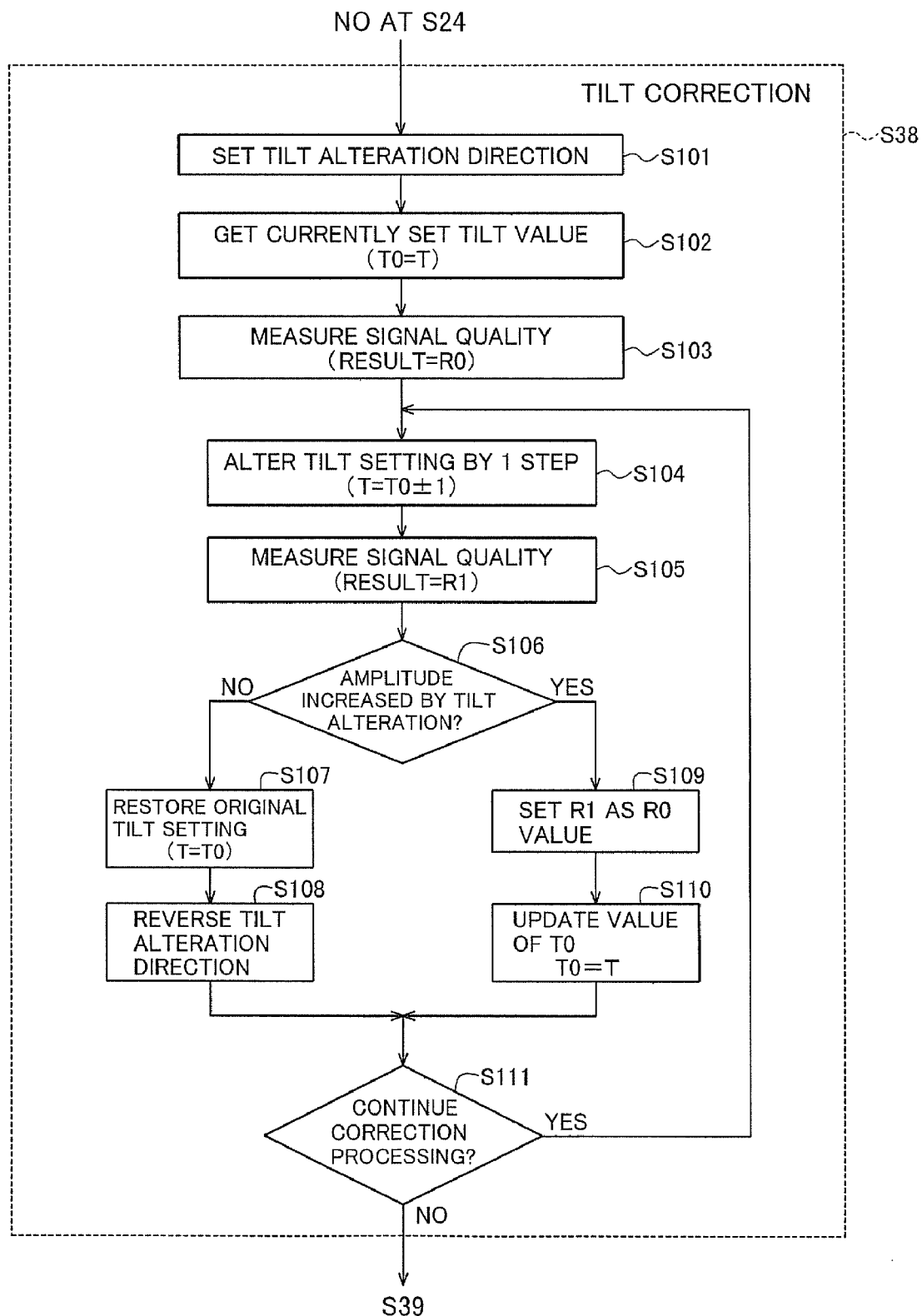
FIG. 14 is a flowchart illustrating an exemplary tilt correction procedure in step S38 in FIG. 13.

FIG. 14 is a drawing illustrating an exemplary tilt correction method in the second embodiment. First, in step S101, the direction in which tilt is corrected (positive or negative) is set. When the process in step S101 is carried out for the first time after the start of data recording, either direction may be set.

In step S102, the currently set tilt value T is obtained and set as a reference tilt value T0. Next, in step S103, the reproducing characteristic (signal amplitude R0 at the reference tilt value T0) of the signal recorded just before is measured. Since the tilt angle at which the amplitude of the reproduced signal is maximized is substantially the same as the tilt angle at which the reproducing performance is maximized, whether the tilt angle has been corrected so as to approach the optimal value is determined from the amplitude of the reproduced signal.

Next, in step S104, the set tilt value is altered by one step (the step width being the amount that alters the least significant digit of the setting value, when represented by a digital signal, by 1). The direction in which the alteration is made is changed to the direction set in step S101. The one-step alteration is a quantity such that a three- to five-step change causes the signal amplitude to vary by one step (this step width being the amount that alters the least significant digit, when the signal amplitude is represented by a digital signal, by one) and is prestored in the central control unit 200 (for example, in the RAM 230).

Next, in step S105, the reproducing characteristic (signal amplitude R1) of the signal recorded just before (the same signal as the one that was reproduced in step S103) is measured.

Next, in step S106, whether or not the signal amplitude was increased by the tilt alteration is determined (YES if R1-R0 is positive; NO if R1-R0 is negative).

If the decision in step S106 is NO, the tilt setting is restored to its previous value in step S107, and the tilt alteration direction is set to the opposite direction from the currently set direction (when the process in step S108 is carried out for the first time after the start of the data recording, the direction is set to the opposite direction from the direction set in step S110). After step S108, the process in step S111 is carried out.

In contrast, if the decision in step S106 is YES, the value of R1 is set as the value of R0. Further, in step S110, the currently set tilt value is set as T0. Next, in step S111, whether or not to continue the correction processing is determined.

If the decision on continuation of the correction processing is NO (the correction processing is terminated), the process in step S38 ends and the process in step S39 is carried out.

If the decision on continuation of the correction process is YES (the correction process is continued), the process returns to step S104, and the same process is repeated using the reference tilt value T0 that was updated in step S109 and step S111 and the signal amplitude value R0 at the reference tilt value T0 as reference values.

The tilt correction process in step S110 must be carried out during one suspension period, so the decision whether or not to continue the correction process in step S111 is based on the time left before the suspension period expires (the correction processing is terminated if it is determined to be impossible to carry out one tilt alteration and signal quality measurement).

Instead of deciding whether or not to continue the correction process in step S111 according to the time left before the suspension period expires, the processing may be terminated if the increase in the signal amplitude calculated in step S106 is small, the inference being that the tilt angle is close to the optimal value.

In FIG. 14, the signal amplitude is used as the signal quality measured in steps S102 and S105, but reproducing performance (jitter value, error rate, etc.) may be measured instead. In this case, the decision in step S106 is YES if the reproducing performance is improved by the tilt alteration, and NO if the reproducing performance is worsened.

In the tilt correction process in step S38, the tilt angle may be varied over a predetermined number of steps and the signal quality may be measured at each step; if the measured signal quality is the signal amplitude, the tilt angle that maximizes the signal amplitude may be set as the corrected tilt angle, and if the measured signal quality is the reproducing performance, the tilt angle that gives the best value may be set as the corrected tilt angle.

In step S104, the tilt setting need not necessarily be made one fixed step at a time (this one step corresponding to a value prestored in the central control unit 200 (e.g., in the RAM 230)); if the resultant difference in the comparison made in step S106 is large, the tilt may be altered in larger steps; if the resultant difference is small, the tilt may be altered in smaller steps.

As described above, in the second embodiment, the tilt angle between the optical disc and the optical head is also corrected, which makes it possible to prevent the write strategy correction from being adversely affected by a degradation of reproducing performance caused by departure of the tilt angle from the optimal value.

Third Embodiment

A procedure will now be described for the optical recording method in the third embodiment. The third embodiment contemplates cases in which all the data are recorded in one process, that is, continuously, as when data are copied from another recording medium to the optical disc 500. In such cases, differing from the recording of broadcasts, data can be recorded independently of the external information source, and accordingly without being constrained by the data transmission bit rate of the external information source.

Figure 15:
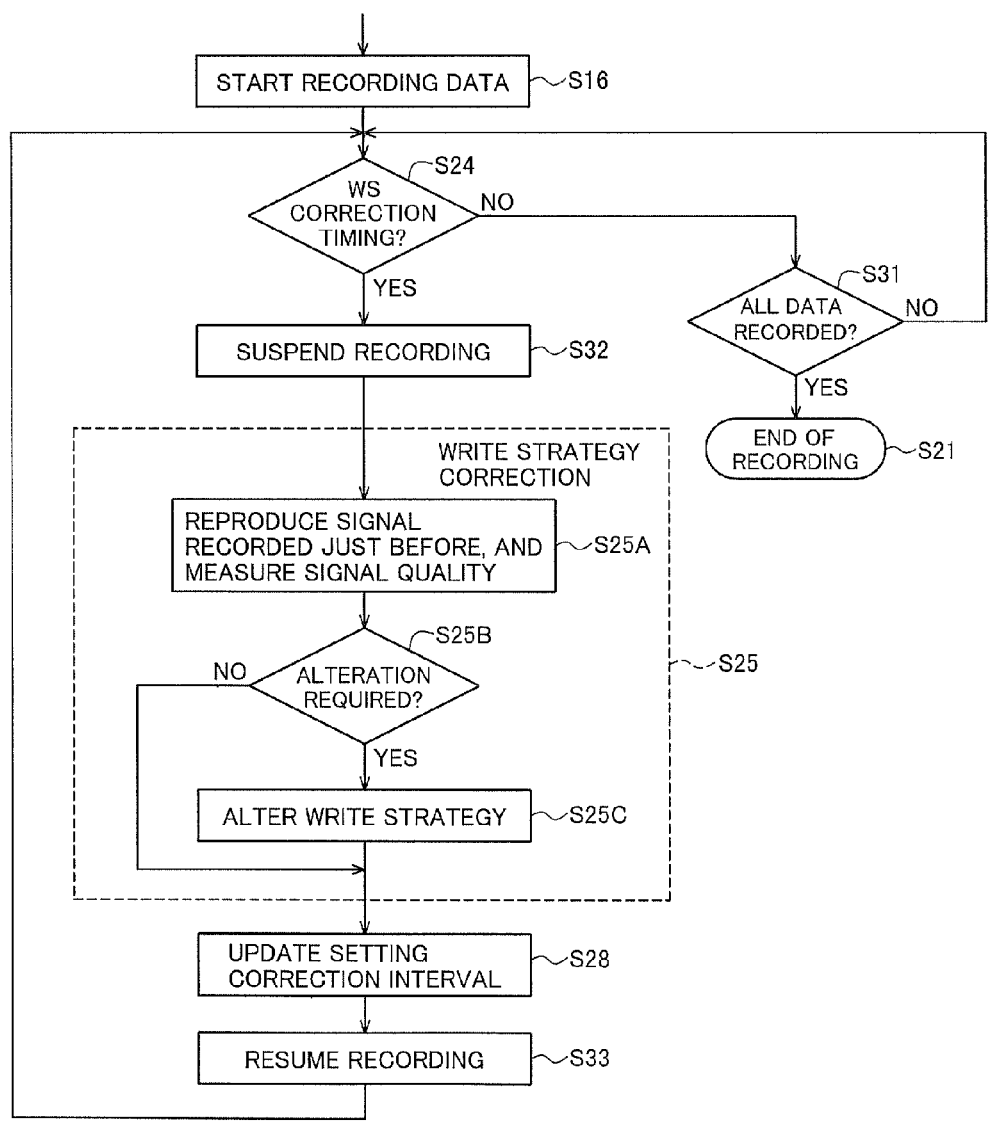
FIG. 15 is a flowchart illustrating a write strategy correction procedure in the optical recording and reproducing apparatus in a third embodiment of the invention.

FIG. 15 is a drawing illustrating the write strategy correction method in the third embodiment. The processes preceding the start of data recording in step S16 in FIG. 15 are omitted because they are the same as in FIG. 6 or 7. Reference numerals in FIG. 15 that are the same as in FIGS. 8 and 9 indicate the same steps.

When data are already available in the host controller 400, as when data are copied from another recording medium to the optical disc 500, and accordingly there are no constraints due to the transmission bit rate of an external information source that supplies the data, as there would be in the recording of a broadcast program, there is no inherent need for the central control unit 200 to control the recording timing precisely, and the data could be recorded onto the optical disc 500 in one continuous process, but in the present invention, recording is suspended during the continuous recording at prescribed setting correction intervals, the quality of the reproduced signal is measured, and the recording conditions are altered as necessary.

After the start of data recording in step S16, step S24 decides whether or not the write strategy correction timing has been reached, that is, whether the setting correction interval has elapsed from the start of data recording or the last write strategy correction.

The setting correction interval depends on the amount of data written onto the optical disc, for example, and the decision as to whether or not the correction timing has been reached is made by comparing the size of the data that have been recorded in the period from the start of recording or the last write strategy correction up to the present with a set data size for determining the correction interval.

If the write strategy correction timing has not been reached (if NO) in step S24, whether or not recording has been completed (whether or not all data to be copied have been recorded) is decided in step S31. If it is decided that recording has been completed (if YES) in step S31, the recording operation is terminated in step S21. If it is decided that all data recording has not been completed (if NO) in step S31, the process returns to the process in step S24. The recording operation continues during this time until all data have been recorded.

In contrast, if the write strategy correction timing has been reached (if YES) in step S24, the recording in progress is suspended in step S32.

Next, the write strategy correction process is carried out in step S25.

In the write strategy correction process (S25), first the process in step S25A is performed.

In step S25A, the data that were recorded just before (just before the recording suspension process in step S32) are reproduced and the quality (jitter value, error rate, etc.) of the reproduced signal is measured. The area from which the signal is reproduced must be at least large enough for measurement of the signal quality.

Next, in step S25B, from the signal quality that was measured in step S25A, whether or not it is necessary to alter the write strategy is determined. If no alteration is necessary, the process proceeds to step S28. If an alteration is necessary, the process proceeds to step S25C.

Next, in step S25C, a write strategy setting value that has been set in the central control unit 200 (e.g., in the RAM 230) is varied by just one step. This alteration is performed on the basis of the signal quality measured in step S25A, the parameter value at the preceding write strategy alteration, the direction of the preceding write strategy alteration, and other factors.

Next, in step S28, if the signal quality that was measured in step S25A is bad (for example, the index indicating the signal quality is worse than a prescribed value (the first prescribed value)), the setting correction interval is shortened; if the signal quality that was measured in step S25A is good (for example, the index indicating the signal quality is worse than a prescribed value (the second prescribed value)), the setting correction interval is lengthened.

In this example, the setting correction interval is assumed to be defined or specified by the amount of data written onto the optical disc, but it may be alternatively defined or specified by the radial displacement (radial displacement from the position at which the preceding correction was performed) of the portion of the optical disc 500 on which the data are recorded.

Many optical discs 500 have large warpage at their outer circumferences and some optical discs 500 may have non-uniform recording characteristics, so in addition to the setting of a setting correction interval based on signal quality as described above, the setting correction interval of the write strategy may be lengthened near the inner circumference and shortened near the outer circumference.

Furthermore, since recording performance may be affected by temperature changes, the internal temperature of the optical recording and reproducing apparatus 100 may be measured, and the correction interval of the write strategy settings may be adjusted in response to the temperature.

At the start of data recording, in order to perform the initial recording quality measurement quickly, an initial value (initial setting of the correction interval) may be stored in the central control unit 200 (e.g., RAM 230) so as to shorten the setting correction interval from the start of recording to the first correction, or the central control unit 200 may force the setting correction interval to a short value (e.g., the shortest correction interval setting) at the start of recording.

After the setting correction interval is updated in step S28, recording is resumed in step S33, and the process returns to step S24 to repeat the same operations again.

Write strategy correction is repeated at the correction interval set in step S28 in this way. The steepest descent method with a signal quality index as an argument (variable) may be used as the write strategy optimization method, or the write strategy parameter to be altered and the direction of the alteration may be determined by learning. A write strategy alteration priority may be preset and alterations may be carried out in the preset order. Write strategy correction (the process in S25), however, is carried out only once during one suspension period, and in a single processing of step S25C, the write strategy is altered only once (if necessary, or not altered at all); the write strategy is not altered multiple times every time step S25C is executed.

Only a write strategy correction is carried out in the third embodiment, but recording power correction and tilt correction processing may also be performed as in the first and second embodiments.

Corrected write strategy values may be recorded onto the optical disc 500 or a write strategy list may be updated as in the first embodiment.

As described above, in the third embodiment, in recording, such as copying, that can inherently be performed continuously, the quality of the recording is measured at setting correction intervals and the write strategy parameters are altered as necessary, so the write strategy can be corrected efficiently in the radial direction on the disc, which enables the degradation of recording quality due to large optical disc warpage and non-uniform recording characteristics, or temperature changes during recording, to be prevented and recording to be carried out with consistent quality.

Since a write strategy correction (the processing in S25) is performed only once during a single suspension period and the write strategy is altered only once per write strategy alteration process (S25C), the impact of the suspension of recording can be reduced. Furthermore, the timing of the write strategy correction is changed according to the signal quality level, which eliminates the need to perform more corrections than required, reducing the load on the central control unit 200 in the optical recording and reproducing apparatus 100.

Fourth Embodiment

A procedure will now be described for the optical recording method in the fourth embodiment. The fourth embodiment, like the third embodiment, contemplates cases in which all the data are recorded in one process, that is, continuously, as when data are copied from another recording medium to the optical disc 500.

Figure 16:
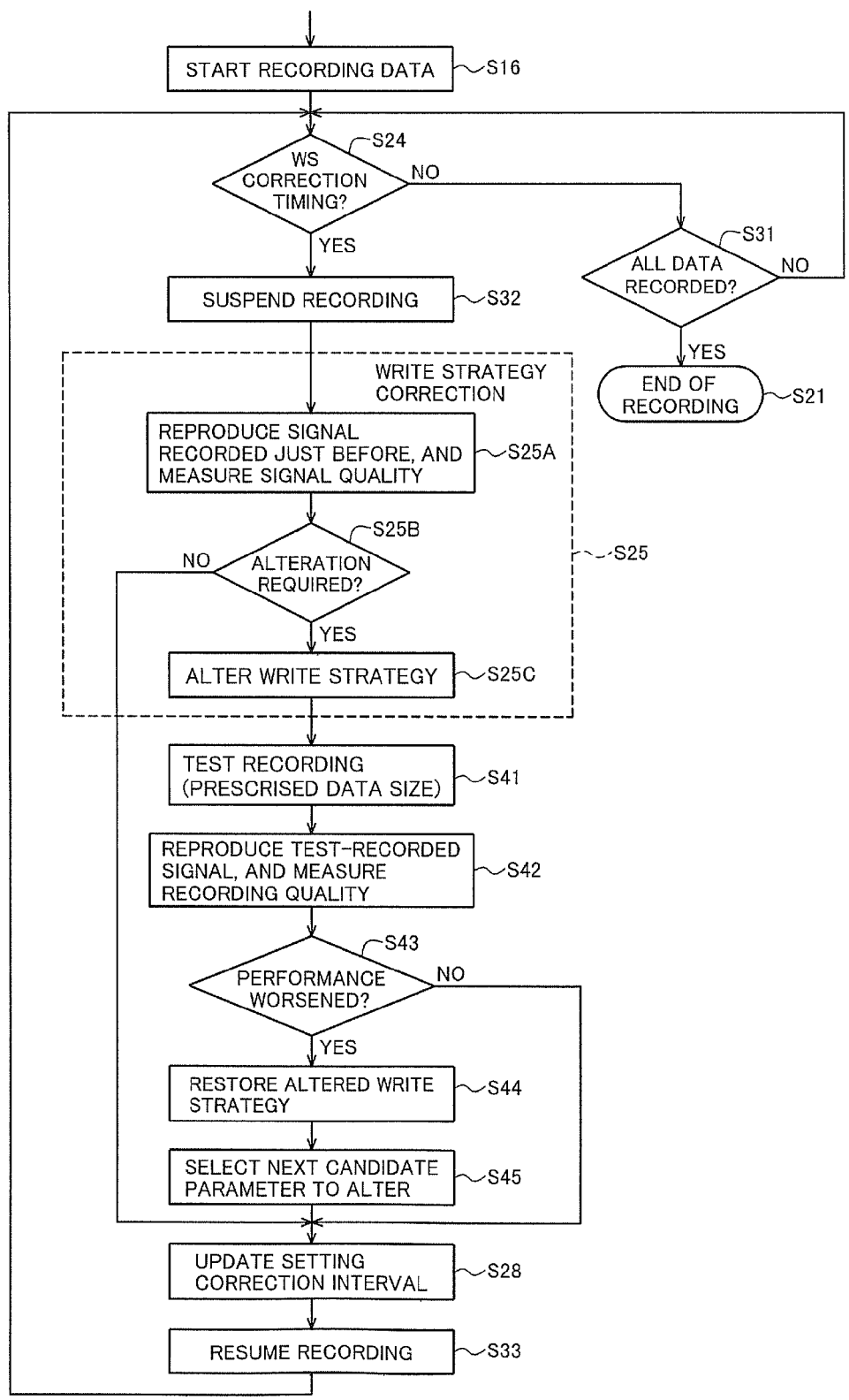
FIG. 16 is a flowchart illustrating a write strategy correction procedure in the optical recording and reproducing apparatus in a fourth embodiment of the invention.

FIG. 16 is a drawing illustrating the write strategy correction method in the fourth embodiment. The processes preceding the start of data recording in step S16 in FIG. 16 are omitted because they are the same as in FIG. 6 or 7. Reference numerals in FIG. 16 that are the same as in FIGS. 8, 9, and 15 indicate the same steps as in those drawings.

After the start of data recording in step S16, step S24 decides whether or not the write strategy correction timing has been reached, that is, whether the setting correction interval has elapsed from the start of data recording or the last write strategy correction.

The setting correction interval depends on the amount of data written onto the optical disc, for example, and the decision whether or not the correction timing has been reached is made by comparing the size of the data that have been recorded in the period from the start of recording or the last write strategy correction up to the present with a set data size for determining the correction interval.

If the write strategy correction timing has not been reached (if NO) in step s24, whether or not the recording has been completed (whether or not all data to be copied have been recorded) is decided in step S31. If it is decided that the recording has been completed (if YES) in step S31, the recording operation is terminated in step S21. If it is decided that all data recording has not been completed (if NO), the process returns to the process in step S24. The recording operation continues during this time until all data have been recorded.

In contrast, if the write strategy correction timing has been reached (if YES) in step S24, the recording in progress is suspended in step S32.

Next, the write strategy correction processing is carried out in step S25.

In the write strategy correction process (S25), first the process in step S25A is performed.

In step S25A, the data that were recorded just before (just before the recording suspension process in step S32) are reproduced and the quality (jitter value, error rate, etc.) of the reproduced signal is measured. The area from which the signal is reproduced must be at least large enough for measurement of the signal quality.

Next, in step S25B, from the signal quality that was measured in step S25A, whether or not it is necessary to alter the write strategy is determined. If no alteration is necessary, the process proceeds to step S28. If an alteration is necessary, the process proceeds to step S25C.

Next, in step S25C, a write strategy setting value that has been set in the central control unit 200 (e.g., in the RAM 230) is varied by just one step. This alteration is performed on the basis of the signal quality measured in step S25A, the parameter value at the preceding write strategy alteration, the direction of the preceding write strategy alteration, and other factors.

Next, in step S41, test recording with a prescribed data size is performed by using the write strategy as altered in step S25C. The test recording is performed in the area in which the next data are recorded, and the data to be recorded next are used as the signal to be recorded (for example, the data following the data the recording of which was suspended in step S32 are recorded in the data area just following the area at which recording was suspended in step S32). The size of the data to be test-recorded at this time is at least sufficient to measure the signal quality, and at least sufficient for decoding in the data decoder 140. The size of the data to be test-recorded may be preset in the central control unit 200 (e.g., in the RAM 230).

Next, in step S42, the signal that was recorded in step S41 is reproduced, and the quality (jitter value, error rate, etc.) of the reproduced signal is measured.

Next, in step S43, whether or not the recording quality measured in step S42 is worse than the recording quality that was measured in step S25A is determined.

In the decision in step S43, if the recording quality measured in step S42 has worsened (if YES), in step S44, the write strategy altered in step S25C is restored to the write strategy before the alteration.

Although the altered write strategy is restored to the write strategy before the alteration (to its original values) in the process in step S44 here, this is not a limitation. For example, a history of previously altered write strategies and the recording quality obtained with each of the altered write strategies may be recorded in the central control unit 200 (e.g., in the RAM 230) and a write strategy may be selected from the previous states.

Next, in step S45, the write strategy parameter to be altered next and its direction of alteration are selected. The setting of the write strategy parameter selected here will be altered in the next alteration of the write strategy in step S25C. Next, the process in step S28 is performed.

If the decision in step S43 is that the recording quality that was measured in step S43 is good, that is, if it has not worsened (if NO), the process in step S28 is performed.

Next, in step S28, the setting correction interval is updated.

If it is decided that the signal quality has worsened (if YES) in step S43, the setting correction interval is altered on the basis of the signal quality that was measured in step S25. That is, if the signal quality that was measured in step S25 is bad (for example, the index indicating the signal quality is worse than a prescribed value (a first prescribed value)), the setting correction interval is shortened; if the signal quality that was measured in step S25 is good (for example, the index indicating the signal quality is worse than a prescribed value (a second prescribed value)), the setting correction interval is lengthened.

If it is decided that the signal quality has not worsened (if NO) in step S43, the setting correction interval is altered on the basis of the signal quality that was measured in step S42.

In this example, the setting correction interval is assumed to be defined or specified by the amount of data written onto the optical disc, but it may alternatively be defined or specified by the radial displacement (radial displacement from the position at which the preceding correction was performed) of the portion of the optical disc 500 on which the data are recorded.

Next, in step S33, recording is resumed by using the set write strategy. Then the process returns to step S24 to repeat the same operations again.

Write strategy correction is repeated at the correction interval set in step S28 in this way. The steepest descent method with a signal quality index as an argument (variable) may be used as the write strategy optimization method, or the write strategy parameter to be altered and the direction of the alteration may be determined by learning. A write strategy alteration priority may be preset and alterations may be carried out in the preset order. Write strategy correction (the processing in S25), however, is carried out only once during one suspension period, and in a single processing of step S25C, the write strategy is altered only once (if necessary, or not altered at all); the write strategy is not altered multiple times every time step S25C is executed.

The same effects as in the third embodiment are also obtained in the fourth embodiment. In addition, the recording area with worsened signal quality can be reduced because the effect of a write strategy alteration is confirmed, by performing just one test recording, after the alteration is made.

In the fourth embodiment, in cases in which all the data are recorded in one process, in other words, the data are recorded independently of the data transmission rate of the external information source, after the write strategy is corrected, one test recording is performed in the data area, but test recording may also be performed in the same way as in the fourth embodiment when the recording of a certain amount of data alternates with the standby suspension of recording as in the first embodiment, responsive to the state of the buffer memory 190, provided the buffer memory 190 does not become empty or the amount of data does not exceed the size of the buffer memory 190.

When the recording of the information is halted, the last write strategy parameters that produced a desirable quality may be stored in a memory means (for example, the RAM 230 in FIG. 1 or a nonvolatile memory (not shown)) as the write strategy as corrected in the write strategy correction means or process (S25), and the stored write strategy parameters may be used in the next recording of information onto the same optical recording medium.

Only a write strategy correction is carried out in the fourth embodiment, but recording power correction and tilt correction processing may also be performed as in the first and second embodiments.

Corrected write strategy values may be recorded onto the optical disc 500 or a write strategy list may be updated as in the first embodiment.

Fifth Embodiment

A procedure will now be described for the optical recording method in the fifth embodiment. In the fifth embodiment, in addition to the write strategy correction in the first to the fourth embodiments, recording power is altered responsive to the write strategy parameter to be corrected and the amount by which it is changed.

Figure 17:
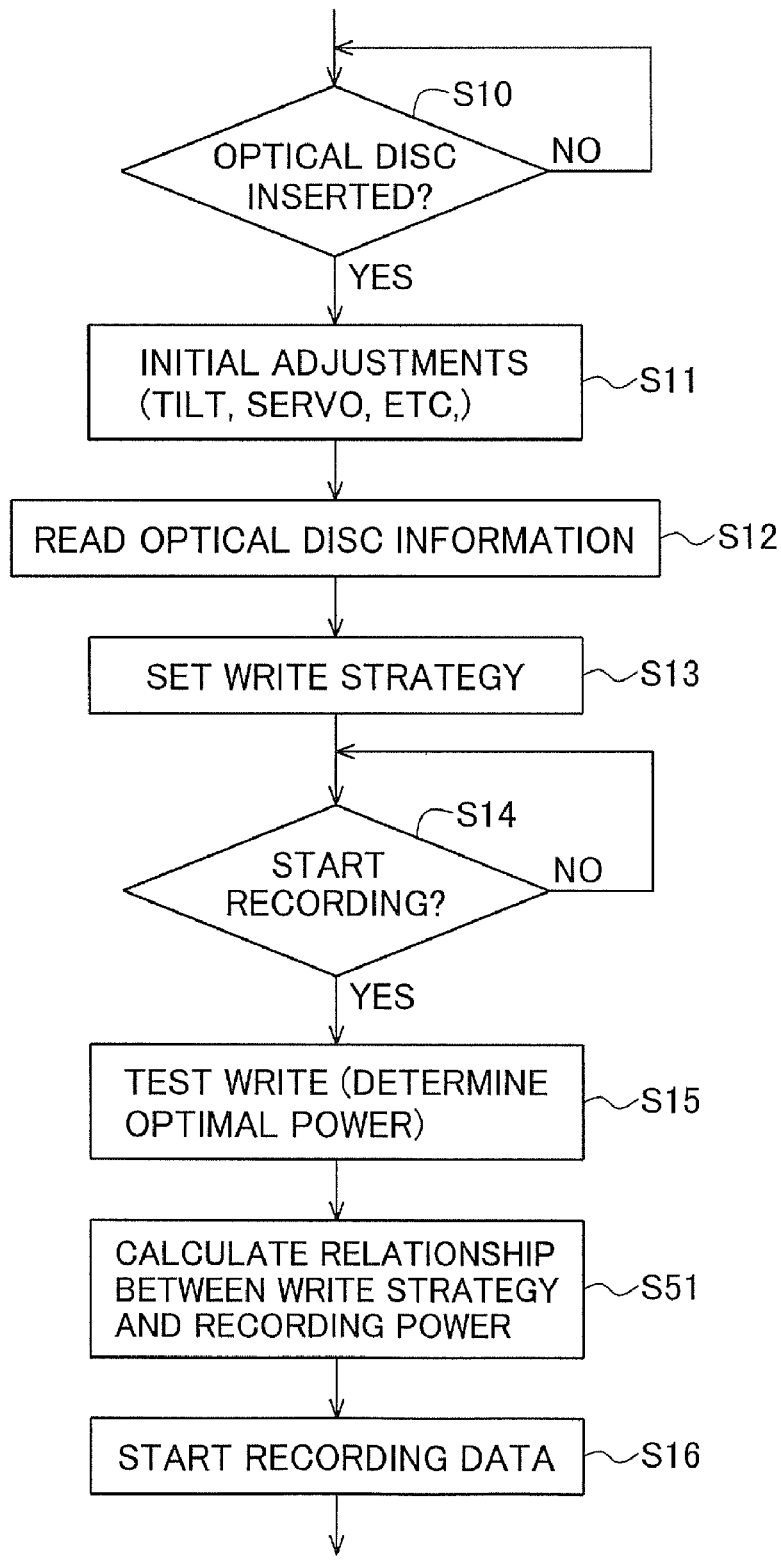
FIG. 17 is a flowchart illustrating a recording procedure in the optical recording and reproducing apparatus in a fifth embodiment of the invention.

FIG. 17 is a drawing illustrating the write strategy correction method in the fifth embodiment. A description of the processes up to step S15 will be omitted because they are the same as in FIG. 6 or 7. Reference numerals in FIG. 17 that are the same as in FIGS. 6 and 7 indicate the same steps.

After the optimal power is determined in step S15, in step S51, the relationship between the write strategy and the recording power (for example, a coefficient determined by the amount of change in the recording power with respect to the amount of change in (each parameter of) the write strategy, that is, the ratio of the latter to the former) is calculated.

For each write strategy parameter, the central control unit 200 holds a relationship (for example, a coefficient determined from the amount of change in a reproducing characteristic with respect to the amount of change in the write strategy parameter, e.g., the ratio of the latter to the former) $KW0i$ ($KW0i$=amount of change in reproducing characteristic/amount of change in write strategy; i is a suffix identifying the type of write strategy parameter) between the write strategy and the reproducing characteristic (asymmetry value or modulation index), and a relationship (a coefficient determined from the amount of change in the reproducing characteristic (value) with respect to the amount of change in recording power, e.g., the ratio of the latter to the former) $KR0$ ($KR0$=amount of change in recording power/amount of change in reproducing characteristic) between the recording power when the relationship $KW0i$ between the write strategy and the reproducing characteristic was decided and the reproducing characteristic (asymmetry value or modulation index) (this relationship $KR0$ is referred to as the 'reference relationship between the write strategy and the recording power'); the relationship (a coefficient determined by the relationship of the amount of change in the recording power to the amount of change in the write strategy, e.g., the ratio of the latter to the former) KPi (KPi=amount of change in recording power/amount of change in the write strategy; i is a suffix identifying the type of write strategy parameter) between the write strategy and the recording power is calculated from the following formula (3) by using the relationship (a coefficient determined by the relationship of the amount of change in reproducing characteristic to the amount of change in recording power, e.g., the ratio of the latter to the former) KR1 between the optimal power that was obtained as a result of the test writing in step S15 and the reproducing characteristic.

$$KPi = KR1 \times KR1/KR0 \times KW0i \quad (3)$$

The reason why the formula above is used will be explained below.

Under the conditions for obtaining the relationship KW0i between the write strategy and the reproducing characteristic and the relationship KR0 between the recording power and the reproducing characteristic, the relationship (a coefficient determined by the relationship of the amount of change in recording power to the amount of change in the write strategy, that is, the ratio of the latter to the former, for example) KP0i is given by the following equation (4).

$$KPi = KW0i \times KR0 \quad (4)$$

The recording sensitivities of the optical discs 500 inserted into the optical recording and reproducing apparatus 100, however, differ depending on the media manufacturer and the permitted recording speed, so even if the relationship KP0i between the write strategy and the recording power calculated from the coefficient held in the central control unit 200 is used, the recording power may not be altered appropriately. In order to perform corrections responsive to the recording sensitivity of the optical disc 500 inserted into the optical recording and reproducing apparatus 100, the relationship between the write strategy and the reproducing characteristic is corrected by using the ratio of the relationship KR1 between the recording power and the reproducing characteristic obtained from the result of the test writing in step S15 and the relationship (reference relationship) KR0 between the recording power and the reproducing characteristic held in the central control unit 200. The relationship KW1i (a coefficient determined by the relationship of the amount of change in the reproducing characteristic to the amount of change in the write strategy, that is, the ratio of the latter to the former) is calculated by the following equation (5) and the result is stored in the central control unit 200.

$$KW1i = KR1/KR0 \times KW0i \quad (5)$$

The relationship KPi between the write strategy and recording power for the optical disc 500 inserted into the optical recording and reproducing apparatus 100 is then calculated by the following equation (6) and the result is stored in the central control unit 200.

$$KPi = KR1 \times KW1i = KR1 \times KR1/KR0 \times KW0i \quad (6)$$

Equation (6) is equivalent to equation (3)

Although, for the correction above, the relationship between the write strategy and the reproducing characteristic is corrected by multiplying the relationship KW0i between the write strategy and the reproducing characteristic held in the central control unit 200 by the ratio between the relationship KR1 between the recording power and the reproducing characteristic obtained by the result of the test writing in step S15 and the relationship KR0 between the recording power and the reproducing characteristic held in the central control unit 200, when it is known in advance that the relationship between the recording power and the reproducing characteristic (the ratio of the amount of change in the reproducing characteristic to the amount of change in the recording power) is different from the relationship between the write strategy and the reproducing characteristic (the ratio of the amount of change in the reproducing characteristic to the amount of change in the write strategy), each of the ratios may be further multiplied by a calibration coefficient. In this case, the relationship represented by the following equation (7) is used.

$$KW1i = CR \times KR1/KR0 \times KW0i \quad (7)$$

In equation (7), CR represents a coefficient for ratio calibration.

Although KW1i and KPi are both stored in the central control unit 200, only one of them need be stored; if KW1i is stored, KPi may be calculated at the time of alteration of the recording power, described later.

The values of KP1, KW1i, and KW0i depend on the write strategy parameter, so values must be stored in the central control unit 200 (e.g., in the RAM 230) for each write strategy parameter.

Finally, in step S16, writing (actual writing) of the original data onto the optical disc 500 begins with the write strategy set in step S13 and the recording power determined in step S15.

In the procedure of the optical recording method in FIG. 17, the process of calculating the relationship between the amount of change in the write strategy and the amount of change in the recording power in step S51 is performed after the test writing in step S15 and before the start of data recording in step S16, but the process in step S51 may be performed after the start of data recording in step S16.

In FIG. 17, the write strategy set in step S13 is used for recording in step S16 and the following steps, but as in step 17 in FIG. 7, test writing may be repeated before step S16 to optimize the write strategy. This optimization may be only a rough adjustment that can be carried out within a required recording time limit (sufficient for recording and reproducing not to end in failure). Alternatively, this optimization may not be performed, but several prepared write strategy candidates may be test written and the best write strategy may be selected from among them.

Figure 18:
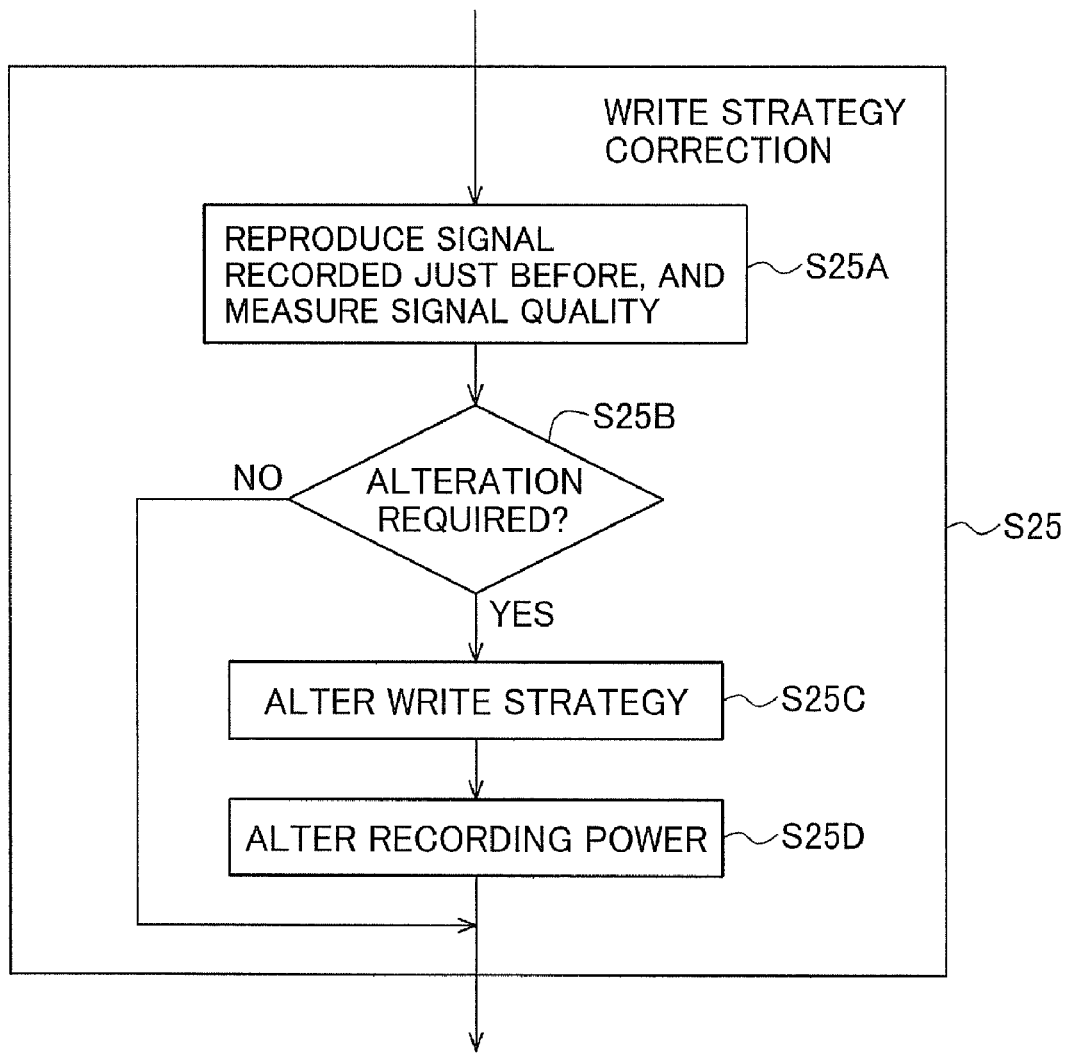
FIG. 18 is a flowchart illustrating a write strategy correction procedure in the optical recording and reproducing apparatus in the fifth embodiment of the invention.

The processes in step S16 and the following steps in the fifth embodiment are generally the same as in FIGS. 8, 9, 10, 15, 16, and 13. In the fifth embodiment, the write strategy correction process differs from the process in FIG. 8. FIG. 18 illustrates a procedure for the write strategy correction (step S25) in the fifth embodiment. Reference numerals in FIG. 18 that are the same as in FIGS. 8, 9, 10, 15, 16, and 13 indicate the same steps.

In fifth embodiment, the write strategy correction process starts with the process in step S25A.

In step S25A, the signal that was previously recorded in step S23 is reproduced and the quality (jitter value, error rate, etc.) of the reproduced signal is measured. The area from which the signal is reproduced must be at least large enough for measurement of the signal quality.

Next, in step S25B, from the signal quality that was measured in step S25A, whether or not it is necessary to alter the write strategy is determined. If no alteration is necessary, the process proceeds to step S28. If an alteration is necessary, the process proceeds to step S25C.

Next, in step S25C, a write strategy setting value that has been set in the central control unit 200 (e.g., in the RAM 230) is varied by just one step (when the setting value is represented by a digital signal, this is the width that varies the least significant digit by just 1). This alteration is performed on the basis of the signal quality measured in step S25A, the parameter value at the preceding write strategy alteration, the direction of the preceding write strategy alteration, and other factors.

Next, in step S25D, the amount of change in the altered write strategy parameter, and the relationship KPi between the amount of change in the write strategy and the amount of change in the recording power that was calculated in the calculation process to obtain the relationship between the write strategy and recording power in step S51 are used to alter the recording power, which is used in the next data recording in step S23. The recording power is calculated by the following equation (8).

$$PWn = PWb - KPi \times (dWSi) \tag{8}$$

In this equation, PWn indicates the recording power to be used in the next recording; PWb indicates the recording power that was used in the previous recording; dWSi indicates the amount of change in the write strategy as altered in step S25C (i.e., the value obtained by subtracting the write strategy value before the alteration from the altered write strategy value). The letter i is a suffix identifying the write strategy parameter.

The reason why the recording power is altered each time the write strategy is corrected will now be described. Alteration of the write strategy causes the quantity of heat transmitted to the optical disc 500 to vary, so even recording using a constant recording power causes the reproducing characteristics (asymmetry value, modulation index, etc.) to change. A significant change in reproducing characteristics due to alteration of the write strategy causes a signal discontinuity at the position where the write strategy was altered, that is, at the recording seam, adversely affecting the waveform equalization characteristic and digitization performance in the decoding of the reproduced signal, which can cause degradation of reproducing performance. In order to prevent abrupt changes in reproducing characteristics due to write strategy correction, the recording power is altered responsive to the amount of correction of the write strategy.

Sixth Embodiment

A procedure will now be described for the optical recording method in the sixth embodiment. In the sixth embodiment, as in the fifth embodiment, recording power is altered in response to correction of the write strategy.

Figure 19:
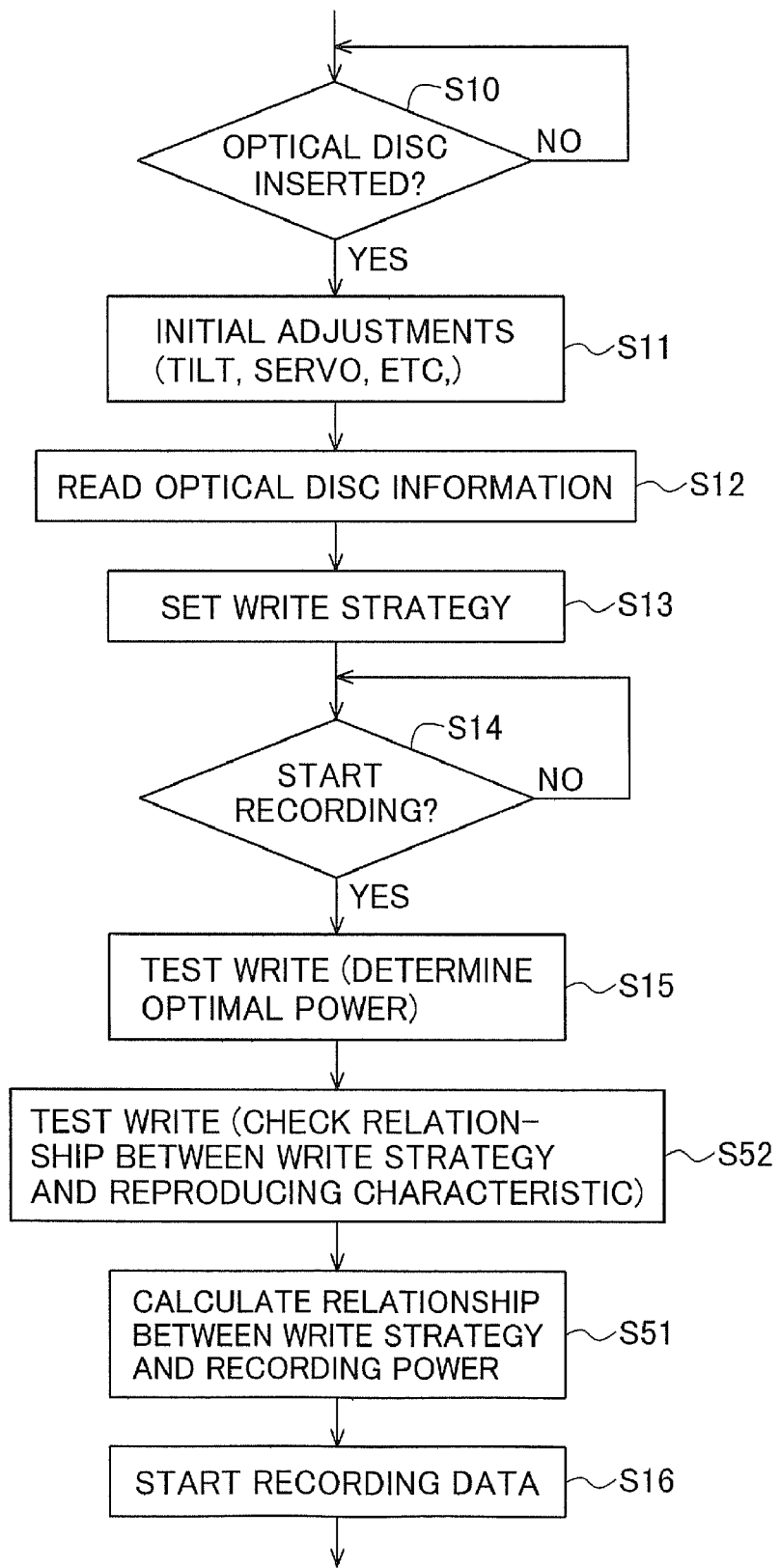
FIG. 19 is a flowchart illustrating a recording procedure in the optical recording and reproducing apparatus in a sixth embodiment of the invention.

FIG. 19 is a drawing illustrating the write strategy correction method in the sixth embodiment. In the optical recording method in FIG. 19, a description of the processes up to step S15 will be omitted because they are the same as in FIGS. 6, 7, and 17. Reference numerals in FIG. 19 that are the same as in FIGS. 6, 7, and 17 indicate the same steps.

After the optimal power is determined in step S15, in step S52, test writing is carried out to check the relationship between the write strategy and the reproducing characteristic (asymmetry value or modulation index), using the optical power determined in step S15 and a write strategy in which the parameters of the write strategy set in step S13 are altered by specified numbers of steps. That is, a write strategy is set in the write strategy control unit 170 by adding or subtracting specified number of steps, set in the central control unit 200, to or from the write strategy set in the central control unit 200 in step S13; the write strategy control unit 170 then generates a write strategy based on a test pattern, and performs test writing onto the optical disc 500 using the optical head 300.

Then the area on the optical disc 500 in which the test pattern is recorded is reproduced by the optical head 300, and the reproducing characteristic (asymmetry value or modulation index) detected by the reproducing characteristic measurement unit 150 is measured to obtain the relationship between the amount of change in the write strategy and the amount of change in the reproducing characteristic.

Next, in step S51, from the result of the test writing in step S15, a relationship KR (KR=amount of change in recording power/amount of change in reproducing characteristic) is obtained, and from the relationship KW2i between the amount of change in the write strategy and the amount of change in the reproducing characteristic (KW2i=amount of change in reproducing characteristic/amount of change in write strategy; i is a suffix identifying the type of write strategy parameter), a relationship between the amount of change in the write strategy and the amount of change in the recording power is obtained as follows and stored in the central control unit 200.

$$KP2i = KR \times KW2i \tag{9}$$

Finally, in step S16, the writing (actual writing) of the intended data onto the optical disc 500 begins, using the write strategy set in step S13 and the recording power set in step S15.

In the procedure of the optical recording method in FIG. 19, after a recording command is issued (in step S14), test writing is performed in step S15 to determine the optimal power, and test writing is performed in step S52 to find the relationship between the write strategy and the reproducing characteristic, but the test writing in steps S15 and S35 may also be performed after the write strategy is set in step S13, during the standby period before the recording command is issued (before step S14).

In step S52, test writing is performed for all the write strategy parameters, but alternatively, it may be performed only for parameters that significantly affect the reproducing characteristic. In this case, for the write strategy parameters for which no test writing is performed, a default relationship between the amount of change in the write strategy parameter and the amount of change in the reproducing characteristic may be used, or the alteration of the recording power in step S25D may be omitted.

Figure 20:
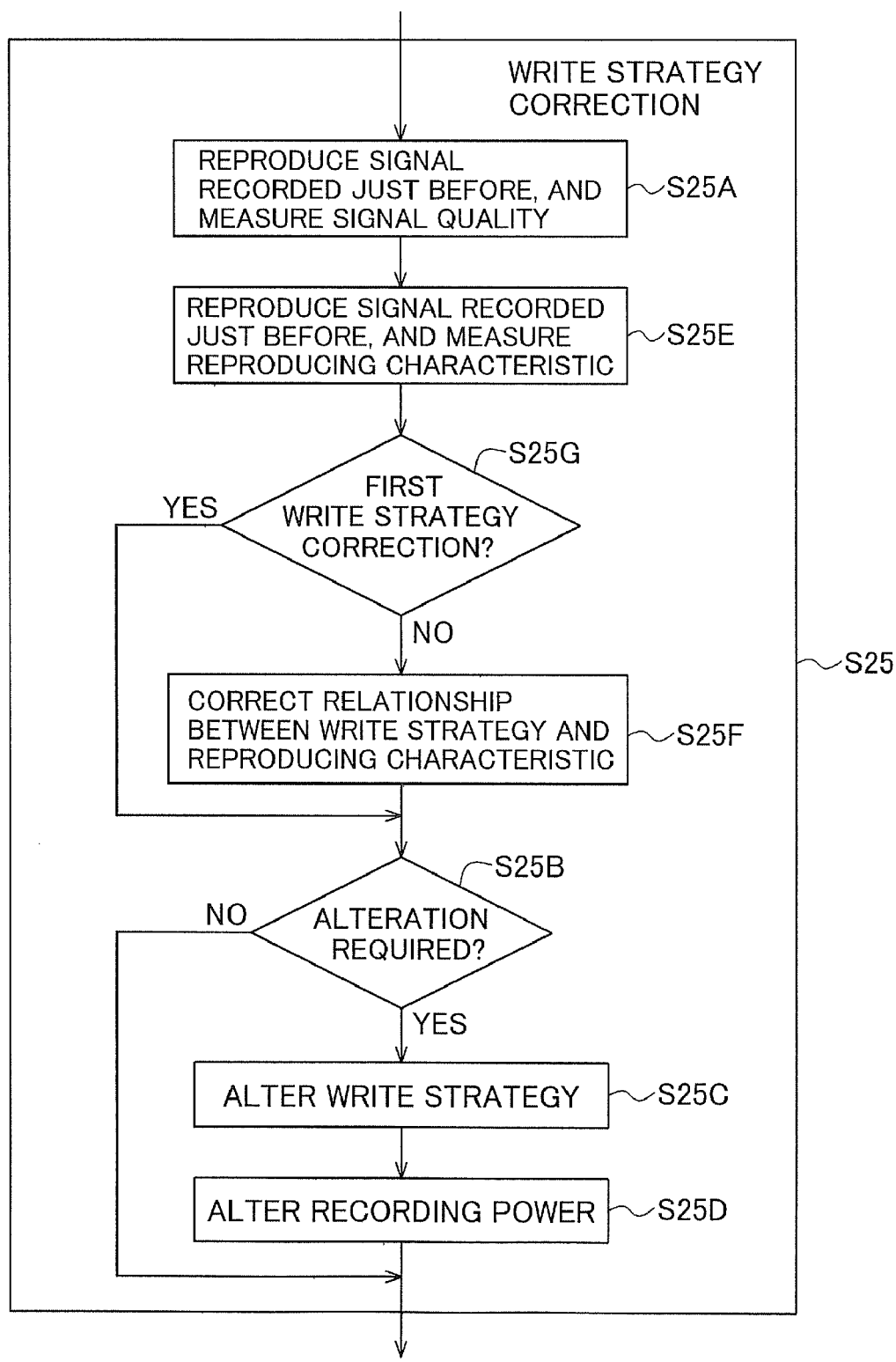
FIG. 20 is a flowchart illustrating a write strategy correction procedure in the optical recording and reproducing apparatus in a seventh embodiment of the invention.

FIG. 20 illustrates a procedure for the write strategy correction (step S25) in the seventh embodiment. Processes other than the write strategy correction process (step S25) are omitted because they are the same as in FIGS. 8, 9, 10, 13, 15, and 16. Reference numerals in FIG. 20 that are the same as in FIG. 18 indicate the same steps.

The write strategy correction process starts with the process in step S25A.

In step S25A, the signal that was previously recorded in step S23 is reproduced and the quality (jitter value, error rate, etc.) of the reproduced signal is measured. The area from which the signal is reproduced must be at least large enough for measurement of the signal quality.

Then, in step S25E, the signal recorded just before is reproduced and a reproducing characteristic (asymmetry value or modulation index) of the reproduced signal is measured.

The signal quality measured in step S25A and the reproducing characteristic measured in step S25E need not be measured separately; simultaneous measurement is preferable if possible.

Next, in step S25G, whether or not the process in step S25 is being performed for the first time is decided. If it is being performed for the first time (YES in step S25G), the relationship between the amount of change in the write strategy and the amount of change in the reproducing characteristic is not corrected, and KW1$i$, used in the fifth embodiment, or KW2$i$, used in the sixth embodiment, is set as a relationship KW3$i$ between the amount of change in the write strategy and the amount of change in the reproducing characteristic.

If the process in step S25 has already been performed one or more times (NO in step S25G), then in step S25F, from the reproducing characteristic (R2) measured in step S25E, the reproducing characteristic (R1) measured before the correction of the write strategy in step S25C, and the amount (dWS$i$) by which the write strategy was altered in step S25C, the relationship between the write strategy and the reproducing characteristic is calculated as:

$$KW4i=(R2-R1)/dWSi \quad (10)$$

The relationship KW4$i$, which is a result including the effect of the recording power alteration that was performed in step S25D when the process in step S25 was performed previously, corresponds to a deficit in the recording power alteration performed previously in step S25D. Accordingly, in step S25F, the relationship KW4$i$ between the write strategy and the reproducing characteristic appearing as the previous deficit amount is added to the previously used relationship KW3$i$ between the write strategy and the reproducing characteristic as follows to correct the relationship between the write strategy and the reproducing characteristic.

$$KW3i=KW3i+KW4i \quad (11)$$

As a condition for performing the write strategy correction process in step S25, the deficit in the recording power alteration due to the preceding write strategy correction process in step S25 has preferably been optimally adjusted by ROPC.

Next, in step S25B, from the signal quality that was measured in step S25A, whether or not a write strategy alteration is necessary is decided. If no alteration is necessary, the process proceeds to step S28. If an alteration is necessary, the process proceeds to step S25C.

Next, in step S25C, the write strategy setting value that has been set in the central control unit 200 (e.g., in the RAM 230) is varied by just one step (when the setting value is represented by a digital signal, this is the width that varies the least significant digit by just 1). This alteration is performed on the basis of the signal quality measured in step S25A, the parameter value at the preceding write strategy alteration, the direction of the preceding write strategy alteration, and other factors.

Next, in step S25D, from the altered write strategy parameter and the amount of the alteration, the relationship KW3$i$ between the write strategy and the reproducing characteristic that was corrected in step S25F, and the relationship KR1 between the recording power and the reproducing characteristic that was obtained in step S15, the recording power is altered by use of the following formula (12).

$$PW2n=PW2b-KR1 \times KW3i \times (dWS2i) \quad (12)$$

PW2$n$ indicates the recording power to be used in the next recording; PW2$b$ indicates the recording power used in the previous recording; dWS2$i$ indicates the amount of alteration of the write strategy in step S25C (a value obtained by subtracting the write strategy value before the alteration from the altered write strategy value). The letter i is a suffix identifying a write strategy parameter.

Although the first to seventh embodiments described above show EFM+modulated data being recorded onto the optical disc 500 (a DVD, for example), this invention is not specialized for EFM+; it is only necessary for the optical recording and reproducing apparatus 100 to allow write strategy parameters to be set by the central control unit 200 according to the type of optical disc 500 and to be able to output a desired write strategy signal. For example, if 1-7 modulated data are recorded onto the optical disc 500 (e.g., a Blu-ray disc (BD)), write strategy parameters suitable for a BD can be set in the central control unit 200 and a write strategy signal suitable for the BD can be generated by the write strategy control unit 170, so the first to seventh embodiments are similarly applicable. If the optical disc 500 is a BD, the optical head 300 of the optical recording and reproducing apparatus 100 may have a partly different structure, but that does not affect the invention. That is, with any type of optical disc 500 or any type of modulation scheme, the first to seventh embodiments are similarly applicable whenever a write strategy is used in recording onto the optical disc 500.

In the first to seventh embodiments, the tilt angle described above is controlled by the actuator of the optical head, but any other device and means capable of controlling the tilt angle may be used instead. If the tilt angle is controlled by a liquid crystal element, for example, the liquid crystal element may be controlled to correct the tilt angle.

As described above, in the present invention, when information is recorded onto an optical disc by alternately repeating a recording period during which a prescribed amount of information is recorded and a standby period during which recording onto the optical disc is suspended to wait for data to accumulate in a buffer, in the standby period, the reproduced quality of the signal recorded just before is measured and the write strategy parameters are altered as necessary, whereby the degradation of recording quality due to large warpage of the optical disc, non-uniform recording characteristics, and temperature changes during recording can be prevented. Since the write strategy parameters are altered in one-step increments, excessive alteration can be avoided, allowing the write strategy correction to be made without causing abrupt degradation of signal quality.

When all information is recorded onto an optical recording medium independently of the external information source (accordingly, when continuous recording is inherently possible), recording is suspended at prescribed intervals (correction intervals); during the suspension periods, the reproduced quality of the signal recorded just before is measured, and the write strategy parameters are altered as necessary, thereby preventing the degradation of recording quality and achieving consistent recording quality. Controlling the interval at which the write strategy is corrected can eliminate superfluous correction of the write strategy.

If the initially set write strategy to be used in recording is not optimal, since the write strategy is altered (if necessary) throughout the recording, the recording quality can be improved.

Since the recording power is altered responsive to the amount of write strategy correction, variations in reproducing characteristics (asymmetry value or modulation index) due to alterations of the write strategy can be reduced to a low level, thereby achieving consistent recording quality.

What is claimed is:

1. An optical recording method for recording information by directing laser light onto an optical recording medium according to a write strategy responsive to recorded data length, the write strategy including a plurality of parameters, the information being recorded on the optical recording medium by alternate repetition of a recording period in which the information, which has been externally supplied, written in a buffer memory, and is read from the buffer memory, is recorded and a suspension period in which recording is suspended, the optical recording method comprising:
- a step of controlling starting of the recording period and starting of the suspension period according to an amount of data in the buffer memory;
- a write strategy correction step of reproducing, during the suspension period, information that has been recorded in the immediately preceding recording period, and correcting a parameter of the write strategy, based on reproduced signal quality;
- a correction timing detection step of detecting a correction timing of the write strategy in the suspension period; and
- a step of performing recording during the next recording period, using the parameter of the write strategy as corrected in the write strategy correction step;
- wherein the write strategy correction step includes
- a quality measurement step of measuring signal quality of a signal recorded just before, and
- a write strategy alteration step of altering the write strategy, based on the reproduced signal quality measured in the quality measurement step; and wherein
- processing of the write strategy correction step in the suspension period is performed conditional on detection of the correction timing in the correction timing detection step; and
- wherein the correction timing detection step detects the correction timing when a setting correction interval has elapsed from starting of recording onto the optical recording medium or when the setting correction interval has elapsed from the most recent performance of the processing of the write strategy correction step; and
- the optical recording method further comprises a setting correction interval update step of altering the setting correction interval according to the reproduced signal quality measured in the quality measurement step.

2. The optical recording method of claim 1, further comprising:
- a recording power correction step of measuring a reproducing characteristic of the signal recorded just before and correcting a recording power on a basis of the measured characteristic of the reproduced signal; and
- a recording power check step of deciding whether or not the recording power as altered in the recording power correction step requires a further recording power correction; wherein:
- just one of the write strategy correction step and the recording power correction step is performed per suspension period; and
- when the further recording power correction is decided to be unnecessary in the recording power check step, the write strategy correction step is performed in the same suspension period as the suspension period in which the recording power check step is performed.

3. The optical recording method of claim 1, further comprising:
- a tilt correction step of measuring a reproducing characteristic of the signal recorded just before and correcting tilt according to the measured characteristic of the reproduced signal;
- a recording power correction step of measuring the reproducing characteristic of the signal recorded just before and correcting the recording power on the basis of the measured characteristic of the reproduced signal; and
- a recording power check step of deciding whether or not further recording power correction is required for the recording power as altered in the recording power correction step; wherein:
- just one of the write strategy correction step, the recording power correction step, and the tilt correction step is performed per suspension period; and
- the write strategy correction step and the tilt correction step are performed when recording power correction is decided to be unnecessary in the recording power check step, during the same suspension period as the suspension period in which the recording power check step is performed.

4. The optical recording method of claim 1, wherein:
- the write strategy correction step includes a recording power alteration step of altering recording power responsive to an amount of change in the corrected write strategy; and
- the recording power alteration step determines a recording power to be used during the next recording period from the amount of change in the write strategy as corrected in the write strategy correction step and a predefined relationship between the write strategy and the recording power before the recording power was altered.

5. The optical recording method of claim 1, wherein the setting correction interval update step lengthens the setting correction interval when the reproduced signal quality measured in the quality measurement step is better than a prescribed value, and shortens the setting correction interval when the reproduced signal quality measured in the quality measurement step is worse than a prescribed value.

6. The optical recording method of claim 1, further comprising a radial position detection step of detecting a radial position in a portion of the recording medium onto which the information is recorded, wherein:
- the setting correction interval update step lengthens the setting correction interval determined according to the reproduced signal quality measured in the quality measurement step if the radial position detected in the radial position detection step is on an inner circumference side of the optical recording medium, and shortens the setting correction interval determined according to the reproduced signal quality measured in the quality measurement step if the radial position detected in the radial position detection step is on an outer circumference side of the optical recording medium.

7. An optical recording apparatus for recording information by directing laser light onto an optical recording medium according to a write strategy responsive to recorded data length, the write strategy including a plurality of parameters,
the information being recorded on the optical recording medium by alternate repetition of a recording period in which the information, which has been externally supplied, written in a buffer memory, and is read from the buffer memory, is recorded and a suspension period in which recording is suspended, the optical recording apparatus comprising:
- a unit configured to control starting of the recording period and starting of the suspension period according to an amount of data in the buffer memory;
- a write strategy correction unit configured to reproduce, during the suspension period, information that has been recorded in the immediately preceding recording period, and to correct a parameter of the write strategy, based on reproduced signal quality;

a correction timing detection unit configured to detect a correction timing of the write strategy in the suspension period; and a unit configured to perform recording during the next recording period, using the parameter of the write strategy as corrected by the write strategy correction unit;

wherein the write strategy correction unit includes a quality measurement unit configured to measure signal quality of a signal recorded just before, and a write strategy alteration unit configured to alter the write strategy, based on the reproduced signal quality measured by the quality measurement unit; and wherein processing of the write strategy correction unit in the suspension period is performed conditional on detection of the correction timing by the correction timing detection unit;

the correction timing detection unit detects the correction timing when a setting correction interval has elapsed from starting of recording onto the optical recording medium or when the setting correction interval has elapsed from the most recent performance of the processing of the write strategy correction unit; and the optical recording apparatus further comprises a setting correction interval updating unit configured to alter the setting correction interval according to the reproduced signal quality measured by the quality measurement unit.

8. The optical recording apparatus of claim 7, comprising:

a test recording unit that, when the parameter of the write strategy is altered by the write strategy alteration unit, uses the altered parameter of the write strategy to test-record data;

a test recording quality measurement unit configured to measure a quality of a signal recorded by the test recording unit; and a unit by which the parameter of the write strategy altered by the write strategy alteration unit is returned to its previous value if the quality of the signal measured by the test recording quality measurement unit is worse than the reproduced signal quality measured by the quality measurement unit.

9. The optical recording apparatus of claim 7, further comprising a recording power correction unit configured to measure a reproducing characteristic of the signal recorded just before and correct a recording power on a basis of the measured characteristic of the reproduced signal; wherein just one of the processing by the write strategy correction unit and the processing by the recording power correction unit is performed per suspension period.

10. The optical recording apparatus of claim 9, wherein the processing by the recording power correction unit and the processing by the write strategy correction unit are performed alternately.

11. The optical recording apparatus of claim 7, further comprising:

a tilt correction unit configured to measure a reproducing characteristic of the signal recorded just before and correct tilt according to the measured characteristic of the reproduced signal;

a recording power correction unit configured to measure the reproducing characteristic of the signal recorded just before and correct the recording power on the basis of the measured characteristic of the reproduced signal; and a recording power check unit configured to decide whether or not further recording power correction is required for the recording power as altered by the recording power correction unit; wherein:

just one of the processing by the write strategy correction unit, the processing by the recording power correction unit, and the processing by the tilt correction unit is performed per suspension period; and the processing by the write strategy correction unit and the processing by the tilt correction unit are performed when recording power correction is decided to be unnecessary by the recording power check unit, during the same suspension period as the suspension period in which the processing by the recording power check unit is performed.

12. The optical recording apparatus of claim 9, further comprising a temperature detection unit configured to detect a temperature difference with respect to a time at which recording starts, wherein:

if the temperature difference detected by the temperature detection unit exceeds a prescribed value, the setting correction interval updating unit shortens the setting correction interval determined according to the reproduced signal quality measured by the quality measurement unit.

13. The optical recording apparatus of claim 7, wherein:

the write strategy correction unit includes a recording power alteration unit configured to alter recording power responsive to an amount of change in the corrected write strategy; and the recording power alteration unit determines the recording power to be used during the next recording period from the amount of change in the write strategy as corrected by the write strategy correction unit and a predefined relationship between the write strategy and the recording power before the recording power was altered.

14. The optical recording apparatus of claim 13, further comprising:

a recording power and reproducing characteristic relation measurement unit configured to determine a relationship between the recording power and a reproducing characteristic; and a write strategy and reproducing characteristic relation calculating unit configured to calculate a relationship between the write strategy and the reproducing characteristic by using the relationship between the recording power and the reproducing characteristic as determined by the recording power and reproducing characteristic relationship measurement unit; wherein the write strategy and reproducing characteristic relationship calculating unit calculates the relationship between the write strategy and the reproducing characteristic used by the recording power alteration unit from a ratio of the relationship between the recording power and the reproducing characteristic determined by the recording power and reproducing characteristic relationship measurement unit to the reference relationship between the write strategy and the reproducing characteristic and the reference relationship between the write strategy and the reproducing characteristic; and the recording power alteration unit determines the recording power to be used during the next recording period from the amount of change in the write strategy as corrected by the write strategy correction unit, the relationship between the recording power and the reproducing characteristic determined by the recording power and reproducing characteristic relationship measurement unit, and the relationship between the corrected write strategy and the reproducing characteristic calculated by the write strategy and reproducing characteristic relationship calculating unit.

15. The optical recording apparatus of claim 13, further comprising:
a recording power and reproducing characteristic relationship measurement unit configured to determine a relationship between the recording power and reproducing characteristic; and
a test writing unit configured to measure a relationship between the write strategy and the reproducing characteristic; wherein,
the test writing unit alters the write strategy and performs test writing of information, reproduces the test-written information, and measures the relationship between the write strategy and the reproducing characteristic from the measured reproduced signal, and
the recording power alteration unit determines the recording power to be used in the next recording period from the relationship between the recording power and the reproducing characteristic determined by the recording power and reproducing characteristic relationship measurement unit and the relationship between the corrected write strategy and the reproducing characteristic measured by the test writing unit.

16. The optical recording apparatus of claim 13, wherein:
the write strategy correction unit further comprises a write strategy and reproducing characteristic relationship correction unit configured to reproduce reproducing information recorded in the immediately preceding recording period and correcting the relationship between the write strategy and the reproducing characteristic according to a reproducing characteristic of the reproduced signal; and
the write strategy and reproducing characteristic relationship correction unit determines an amount of correction of the relationship between the write strategy and reproducing characteristic from the reproducing characteristic of the signal recorded in the immediately preceding recording period, the reproducing characteristic before the write strategy was previously corrected, and the amount of change in the write strategy as previously corrected, and uses a relationship between the write strategy and the reproducing characteristic obtained by adding the amount of correction to the previously used relationship between the write strategy and the reproducing characteristic to alter the recording power in the next recording power alteration by the recording power alteration unit.

17. The optical recording apparatus of claim 7, further comprising:
a parameter holding unit configured to hold the parameters of the write strategy and a quality of a signal recorded with the write strategy parameters;
a quality and parameter updating unit configured to update the values held by the parameter holding unit to indicate the value of the altered parameter of the write strategy and the value of the quality of the signal recorded by using the altered parameter of the write strategy;
when the quality of the signal recorded with the parameter of the write strategy as altered by the write strategy alteration unit is better than the quality of the signal held by the parameter holding nit; and
a recording unit configured to record the values of the parameters of the write strategy held by the parameter holding unit on the optical recording medium.

18. The optical recording apparatus of claim 7, having a list of write strategies corresponding to optical recording media, comprising:
a list updating unit configured to update the write strategy parameters in the list
when the quality of a signal recorded with the parameters of a write strategy altered by the write strategy alteration unit is better than the quality of a signal recorded with the parameters of a write strategy recorded in the list.

19. The optical recording apparatus of claim 7, wherein the setting correction interval updating unit lengthens the setting correction interval when the reproduced signal quality measured by the quality measurement unit is better than a prescribed value, and shortens the setting correction interval when the reproduced signal quality measured by the quality measurement unit is worse than a prescribed value.

20. The optical recording apparatus of claim 7, further comprising a radial position detection unit configured to detect a radial position in a portion of the recording medium onto which the information is recorded, wherein:
the setting correction interval updating unit lengthens the setting correction interval determined according to the reproduced signal quality measured by the quality measurement unit if the radial position detected by the radial position detection unit is on an inner circumference side of the optical recording medium, and shortens the setting correction interval determined according to the reproduced signal quality measured by the quality measurement unit if the radial position detected by the radial position detection unit is on an outer circumference side of the optical recording medium.

* * * * *